(12) United States Patent
Pipchuk et al.

(10) Patent No.: US 10,597,970 B2
(45) Date of Patent: Mar. 24, 2020

(54) DOWNHOLE CUTTING AND SEALING APPARATUS

(71) Applicant: SCHLUMBERGER TECHNOLOGY CORPORATION, Sugar Land, TX (US)

(72) Inventors: Douglas Pipchuk, Calgary (CA); Iain Michael Cooper, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/546,802

(22) PCT Filed: Jan. 27, 2016

(86) PCT No.: PCT/US2016/015026
§ 371 (c)(1),
(2) Date: Jul. 27, 2017

(87) PCT Pub. No.: WO2016/123166
PCT Pub. Date: Aug. 4, 2016

(65) Prior Publication Data
US 2018/0003001 A1    Jan. 4, 2018

Related U.S. Application Data

(60) Provisional application No. 62/108,393, filed on Jan. 27, 2015.

(51) Int. Cl.
*E21B 33/138*    (2006.01)
*E21B 33/13*    (2006.01)
*E21B 33/134*    (2006.01)
*B23K 26/356*    (2014.01)
*E21B 29/00*    (2006.01)
*E21B 29/06*    (2006.01)
(Continued)

(52) U.S. Cl.
CPC ............ *E21B 33/138* (2013.01); *E21B 33/13* (2013.01); *E21B 33/134* (2013.01); *B23K 26/356* (2015.10); *E21B 10/61* (2013.01); *E21B 29/002* (2013.01); *E21B 29/06* (2013.01); *E21B 43/112* (2013.01)

(58) Field of Classification Search
CPC ....... E21B 33/13; E21B 33/138; E21B 33/134
See application file for complete search history.

(56) References Cited

U.S. PATENT DOCUMENTS 2,381,929 A * 8/1945 Schlumberger ......... E21B 33/14
166/100
4,227,582 A   10/1980 Price
8,455,793 B2   6/2013 Domec et al.
(Continued)

OTHER PUBLICATIONS

International Search Report and Written Opinion issued in International Patent Appl. No. PCT/US2016/015026 dated Apr. 22, 2016; 22 pages.
(Continued)

*Primary Examiner* — Kristyn A Hall
(74) *Attorney, Agent, or Firm* — Cathy Hewitt

(57) ABSTRACT

A downhole tool for conveyance within a tubular secured in a wellbore extending into a subterranean formation. The downhole tool includes a sealing material and a laser apparatus operable to cut a slot in the tubular. The downhole tool is operable to provide melted sealing material within the slot.

48 Claims, 13 Drawing Sheets

(51) Int. Cl.
*E21B 10/61* (2006.01)
*E21B 43/112* (2006.01)

(56) References Cited

U.S. PATENT DOCUMENTS

| | | |
|---|---|---|
| 2006/0144591 A1 | 7/2006 | Gonzalez et al. |
| 2006/0185843 A1 | 8/2006 | Smith, Jr. |
| 2010/0326659 A1 | 12/2010 | Schultz et al. |
| 2011/0017450 A1 | 1/2011 | Pietrobelli et al. |
| 2013/0008653 A1 | 1/2013 | Schultz et al. |
| 2014/0060930 A1 | 3/2014 | Zediker et al. |
| 2014/0190949 A1 | 7/2014 | Zediker et al. |
| 2016/0319651 A1* | 11/2016 | Willimas ................ E21B 37/10 |
| 2018/0066489 A1* | 3/2018 | Pipchuk .................. E21B 33/12 |

OTHER PUBLICATIONS

Extended European search report issued in European Patent Appl. No. 16744008.0 dated Sep. 3, 2018; 6 pages.

* cited by examiner

DOWNHOLE CUTTING AND SEALING APPARATUS

CROSS-REFERENCE TO RELATED APPLICATIONS

This application claims priority to and the benefit of U.S. Provisional Application No. 62/108,393, titled "METHOD OF ACTIVATING A EUTECTIC MATERIAL FOR WELLBORE APPLICATIONS WITH A LASER," filed Jan. 27, 2015, the entire disclosure of which is hereby incorporated herein by reference.

BACKGROUND OF THE DISCLOSURE

The present disclosure is related in general to wellsite equipment, such as oilfield surface equipment, downhole assemblies, coiled tubing (CT) assemblies, slickline assemblies, and the like. The present disclosure is also related to the use of laser cutting equipment and sealing materials for repairing or sealing completion tubulars and other conduits located within a wellbore and/or for repairing or sealing portions of rock formation around the wellbore.

Coiled tubing is a technology that has been expanding its range of application since its introduction to the oil industry in the 1960's. Its ability to pass through the completion tubulars and the wide array of tools and technologies that may be used in conjunction with it make coiled tubing a versatile technology. Typical coiled tubing apparatus include surface pumping facilities, a coiled tubing string mounted on a reel, a method to convey the coiled tubing into and out of the wellbore (such as an injector head or the like), and surface control apparatus at the wellhead. Coiled tubing has been utilized for performing well treatment and/or well intervention operations in existing wellbores, such as, but not limited to, hydraulic fracturing, matrix acidizing, milling, perforating, coiled tubing drilling, and the like.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a downhole tool for conveyance within a tubular secured in a wellbore extending into a subterranean formation. The downhole tool includes: a laser apparatus operable to cut a slot in the tubular; and a sealing material. The downhole tool is operable to provide melted sealing material within the slot.

The present disclosure also introduces an apparatus that includes a downhole tool for conveyance within a tubular secured within a wellbore extending into a subterranean formation. The downhole tool includes: a laser apparatus operable to form a slot along the tubular; a sealing material; and a spreader operable to direct the sealing material into the slot. The downhole tool is operable to melt the sealing material within the slot.

The present disclosure also introduces a method that includes conveying a laser apparatus within a tubular secured within a wellbore extending into a subterranean formation. The laser apparatus is operated to form a slot along the tubular. A sealing material is conveyed within the tubular. A melted sealing material is provided within the slot such that the melted sealing material seals the slot upon solidification.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure may be understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
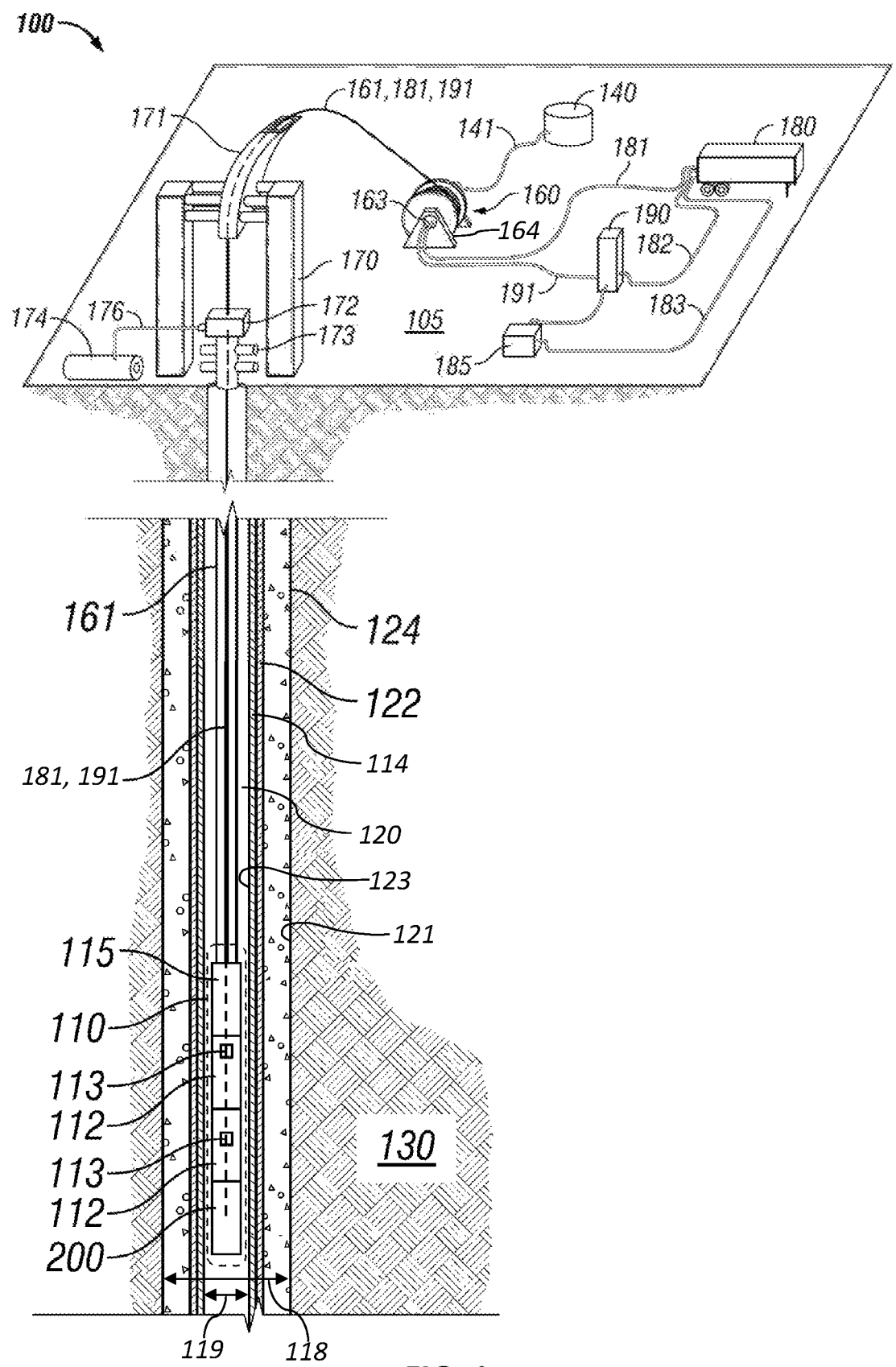
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example wellsite system 100 according to one or more aspects of the present disclosure, representing an example coiled tubing environment in which one or more apparatus described herein may be implemented, including to perform one or more methods and/or processes also described herein. However, it is to be understood that aspects of the present disclosure are also applicable to implementations in which wireline, slickline, and/or other conveyance means are utilized instead of or in addition to coiled tubing.

FIG. 1 depicts a wellsite surface 105 upon which various wellsite equipment is disposed proximate a wellbore 120. FIG. 1 also depicts a sectional view of the Earth below the wellsite surface 105 containing the wellbore 120, as well as a tool string 110 positioned within the wellbore 120. The wellbore 120 has a sidewall 121 and extends from the wellsite surface 105 into one or more subterranean formations 130. When utilized in cased-hole implementations, a cement sheath 124 may secure a casing 122 within the wellbore 120. However, one or more aspects of the present disclosure are also applicable to open-hole implementations, in which the cement sheath 124 and the casing 122 have not yet been installed in the wellbore 120. The wellbore 120 may further include a completion/production tubular 114, which may be disposed within the casing 122.

At the wellsite surface 105, the wellsite system 100 may comprise a control and power center 180 (referred to hereinafter as a "control center") comprising processing and communication equipment operable to send, receive, and process electrical and/or optical control signals to control at least some aspects of operations of the wellsite system 100. The control center 180 may also provide electrical power and communicate the control signals via electrical conductors 181, 182, 183 extending between the control center 180 and a laser source 190, a laser generator chiller 185, and the tool string 110 positioned within the wellbore 120. The laser source 190 may provide energy in the form of a laser beam to at least a portion of the tool string 110. The laser source 190 may provide the laser beam to the tool string 110 via an optical conductor 191, which may comprise one or more fiber optic cables.

The electrical conductor 181 may comprise a plurality of conduits or conduit portions interconnected in series and/or in parallel between the control center 180 and the tool string 110. For example, as depicted in the example implementation of FIG. 1, the electrical conductor 181 may comprise a stationary portion extending between the control center 180 and a reel 160 of coiled tubing 161, such that the stationary portion of the electrical conductor 181 remains substantially stationary with respect to the wellsite surface 105 during conveyance of the tool string 110. The electrical conductor 181 further comprises a moving portion extending between the reel 160 and the tool string 110 via the coiled tubing 161, including the coiled tubing 161 spooled on the reel 160. Thus, the moving portion of the electrical conductor 181 may rotate and otherwise move with respect to the wellsite surface 105 during the conveyance of the tool string 110.

Similarly, the optical conductor 191 may comprise a plurality of conduits or conduit portions interconnected in series and/or in parallel between the laser source 190 and the tool string 110. For example, as depicted in the example implementation of FIG. 1, the optical conductor 191 may comprise a stationary portion extending between the laser source 190 and the reel 160 of the coiled tubing 161, such that the stationary portion of the optical conductor 191 remains substantially stationary with respect to the wellsite surface 105 during the conveyance of the tool string 110. The optical conductor 191 may further comprise a moving portion extending between the reel 160 and the tool string 110 via the coiled tubing 161, including the coiled tubing 161 spooled on the reel 160. Thus, the moving portion of the optical conductor 191 may rotate and otherwise move with respect to the wellsite surface 105 during the conveyance of the tool string 110. A swivel or rotary joint 163, such as may be known in the art as a collector, provides an interface between the stationary and moving portions of the electrical and optical conductors 181, 191.

The wellsite system 100 may further comprise a fluid source 140 from which a fluid (referred to hereinafter as a "surface fluid") may be communicated by a fluid conduit 141 to the reel 160 of the coiled tubing 161 and/or other conduits that may be deployed into the wellbore 120. The fluid conduit 141 may be fluidly connected with the coiled tubing 161 by, for example, a swivel or another rotating coupling (obstructed from view). The coiled tubing 161 may be operable to communicate the surface fluid received from the fluid source 140 to the tool string 110 coupled at a downhole end of the coiled tubing 161.

The coiled tubing 161 may be further operable to transmit or convey therein the moving portions of the optical and/or electrical conductors 181, 191 from the wellsite surface 105 to the tool string 110. The electrical and optical conductors 181, 191 may be disposed within an internal passage of the coiled tubing 161 inside a protective metal carrier (not shown) to insulate and protect the conductors 181, 191 from the surface fluid inside the coiled tubing 161. However, the optical and/or electrical conductors 181, 191 may also or instead be secured externally to the coiled tubing 161 or embedded within the structure of the coiled tubing 161. The reel 160 may be rotationally supported on the wellsite surface 105 by a stationary base 164, such that the reel 160 may be rotated to advance and retract the coiled tubing 161, including the electrical and optical conductors 181, 191, within the wellbore 120, such as during the conveyance of the tool string 110 within the wellbore 120.

The wellsite system 100 may further comprise a support structure 170, such as may include a coiled tubing injector 171 and/or other apparatus operable to facilitate movement of the coiled tubing 161 in the wellbore 120. Other support structures, such as a derrick, a crane, a mast, a tripod, and/or other structures, may also or instead be included. A diverter 172, a blow-out preventer (BOP) 173, and/or a fluid handling system 174 may also be included as part of the wellsite system 100. For example, during deployment, the coiled tubing 161 may be passed from the injector 171, through the diverter 172 and the BOP 173, and into the wellbore 120.

The tool string 110 may be conveyed along the wellbore 120 via the coiled tubing 161 in conjunction with the coiled tubing injector 171, which may be operable to apply an adjustable uphole and downhole force to the coiled tubing 161 to advance and retract the tool string 110 within the wellbore 120. Although FIG. 1 depicts a coiled tubing injector 171, it is to be understood that other means operable to advance and retract the tool string 110, such as a crane, a winch, a draw-works, a top drive, and/or other lifting device coupled to the tool string 110 via the coiled tubing 161 and/or other conveyance means (e.g., wireline, drill pipe, production tubing, etc.), may also or instead be included as part of the well site system 100.

During some downhole operations, the surface fluid may be conveyed through the coiled tubing 161 and caused to exit into the wellbore 120 adjacent to the tool string 110. For example, in the open-hole implementation, the surface fluid may be directed into an annular area between the sidewall 121 of the wellbore 120 and the tool string 110 through one or more ports or nozzles (not shown) in the coiled tubing 161 and/or the tool string 110. However, in the cased-hole implementation, the surface fluid may be directed into an annular area between an inner surface 123 and the tool string 110 through one or more ports or nozzles in the coiled tubing 161 and/or the tool string 110. The inner surface 123 may be an inner surface of the casing 122 or an inner surface of the completion/production tubular 114, if disposed within the casing 122. Thereafter, the surface fluid and/or other fluids may return in the uphole direction and out of the wellbore 120. The diverter 172 may direct the returning fluid to the fluid handling system 174 through one or more conduits 176. The fluid handling system 174 may be operable to clean the returning fluid and/or prevent the returning fluid from escaping into the environment. The returned fluid may then be directed to the fluid source 140 or otherwise contained for later use, treatment, and/or disposal.

The tool string 110 may comprise one or more modules, sensors, and/or tools 112, hereafter collectively referred to as the tools 112. For example, one or more of the tools 112 may be or comprise at least a portion of a monitoring tool, an acoustic tool, a density tool, a drilling tool, an electromagnetic (EM) tool, a formation testing tool, a fluid sampling tool, a formation logging tool, a formation measurement tool, a gravity tool, a magnetic resonance tool, a neutron tool, a nuclear tool, a photoelectric factor tool, a porosity tool, a reservoir characterization tool, a resistivity tool, a seismic tool, a surveying tool, a tough logging condition (TLC) tool, a plug, and/or one or more perforating guns and/or other perforating tools, among other examples within the scope of the present disclosure.

One or more of the tools 112 may be or comprise a casing collar locator (CCL) operable to detect ends of casing collars by sensing a magnetic irregularity caused by the relatively high mass of an end of a collar of the casing 122. One or more of the tools 112 may also or instead be or comprise a gamma ray (GR) tool that may be utilized for depth correlation. The CCL and/or GR tools may transmit signals in real-time to wellsite surface equipment, such as the control center 180, via the electrical conductor 181 or another communication means. The CCL and/or GR tool signals may be utilized to determine the position of the tool string 110 and/or selected portions of the tool string 110, such as with respect to known casing collar numbers and/or positions within the wellbore 120. Therefore, the CCL and/or GR tools may be utilized to detect and/or log the location of the tool string 110 within the wellbore 120, such as during downhole operations described below.

One or more of the tools 112 may also comprise one or more sensors 113. The sensors 113 may include inclination and/or other orientation sensors, such as accelerometers, magnetometers, gyroscopic sensors, and/or other sensors for utilization in determining the orientation of the tool string 110 relative to the wellbore 120. The sensors 113 may also or instead include sensors for utilization in determining petrophysical and/or geophysical parameters of a portion of the formation 130 along the wellbore 120, such as for measuring and/or detecting one or more of pressure, temperature, strain, composition, and/or electrical resistivity, among other examples within the scope of the present disclosure. The sensors 113 may also or instead include fluid sensors for utilization in detecting the presence of fluid, a certain fluid, or a type of fluid within the tool string 110 or the wellbore 120. The sensors 113 may also or instead include fluid sensors for utilization in measuring properties and/or determining composition of fluid sampled from the wellbore 120 and/or the formation 130, such as spectrometers, fluorescence sensors, optical fluid analyzers, density sensors, viscosity sensors, pressure sensors, and/or temperature sensors, among other examples within the scope of the present disclosure.

The wellsite system 100 may also include a telemetry system comprising one or more downhole telemetry tools 115 (such as may be implemented as one or more of the tools 112) and/or a portion of the control center 180 to facilitate communication between the tool string 110 and the control center 180. The telemetry system may be a wired electrical telemetry system and/or an optical telemetry system, among other examples.

The tool string 110 may also include a downhole tool 200 operable to repair tubular members downhole, such as the casing 122 and/or the completion/production tubular 114, which may be disposed within the casing 122. The downhole tool 200 may be further operable to repair a portion of the cement sheath 124 securing the casing 122 within the wellbore 120. The downhole tool 200 may also be operable to repair a portion of the subterranean formation 130 surrounding or defining the wellbore 120 in both the cased-hole and open-hole implementations. For example, the downhole tool 200 may be operable to smooth out, patch, plug, or otherwise repair holes, perforations, scrapes, deformations, and other damaged portions along the sidewall 121 in an open-hole implementation and/or the inner surface 123 in a cased-hole implementation, including damage to the completion/production tubular 114, the casing 122, the cement sheath 124, and/or the formation 130 surrounding the wellbore 120. The downhole tool 200 may comprise a laser cutting apparatus operable to direct the laser beam upon the damaged portions along the sidewall 121 and/or the inner surface 123 to remove or cut the damaged portion by forming one or more radially extending cavities or slots (referred to hereinafter as "radial slots") along the damaged portion. The radial slots (shown in and identified in FIGS. 5-7 with numeral 286) may extend through or penetrate the completion/production tubular 114, the casing 122, the cement sheath 124, and/or the formation 130 a predetermined depth.

Although FIG. 1 shows the tool string 110, including the downhole tool 200, disposed within a vertical portion of the wellbore 120 to form the radial slots extending outwardly along a substantially horizontal plane, it is to be understood that the downhole tool 200 may also be utilized to form the radial slots in a horizontal or partially deviated portion of the wellbore 120. Accordingly, the radial slots may also be formed along a plane extending substantially vertically or diagonally with respect to the wellsite surface 105.

The tool string 110 is further shown in connection with the optical conductor 191 and the electrical conductor 181, which may extend through at least a portion of the tool string 110, including the downhole tool 200. The optical conductor 191 may be operable to transmit the laser beam from the laser source 190 to the downhole tool 200, whereas the electrical conductor 181 may be operable to transmit the electrical control signals and/or the electrical power between the control center 180 and the tool string 110, including the downhole tool 200.

The electrical conductor 181 may also permit electrical communication between the several portions of the tool string 110 and may comprise various electrical connectors and/or interfaces (not shown) for electrical connection with the several portions of the tool string 110. Although the electrical conductor 181 is depicted in FIG. 1 as a single continuous electrical conductor, the wellsite system 100 may comprise a plurality of electrical conductors (not shown) extending along the coiled tubing 161 and/or the tool string 110. Also, although FIG. 1 depicts the downhole tool 200 being coupled at a downhole end of the tool string 110, the downhole tool 200 may be coupled between the tools 112, or further uphole in the tool string 110 with respect to the tools 112. The tool string 110 may also comprise more than one instance of the downhole tool 200, as well as other apparatus not explicitly described herein.

Figure 2:
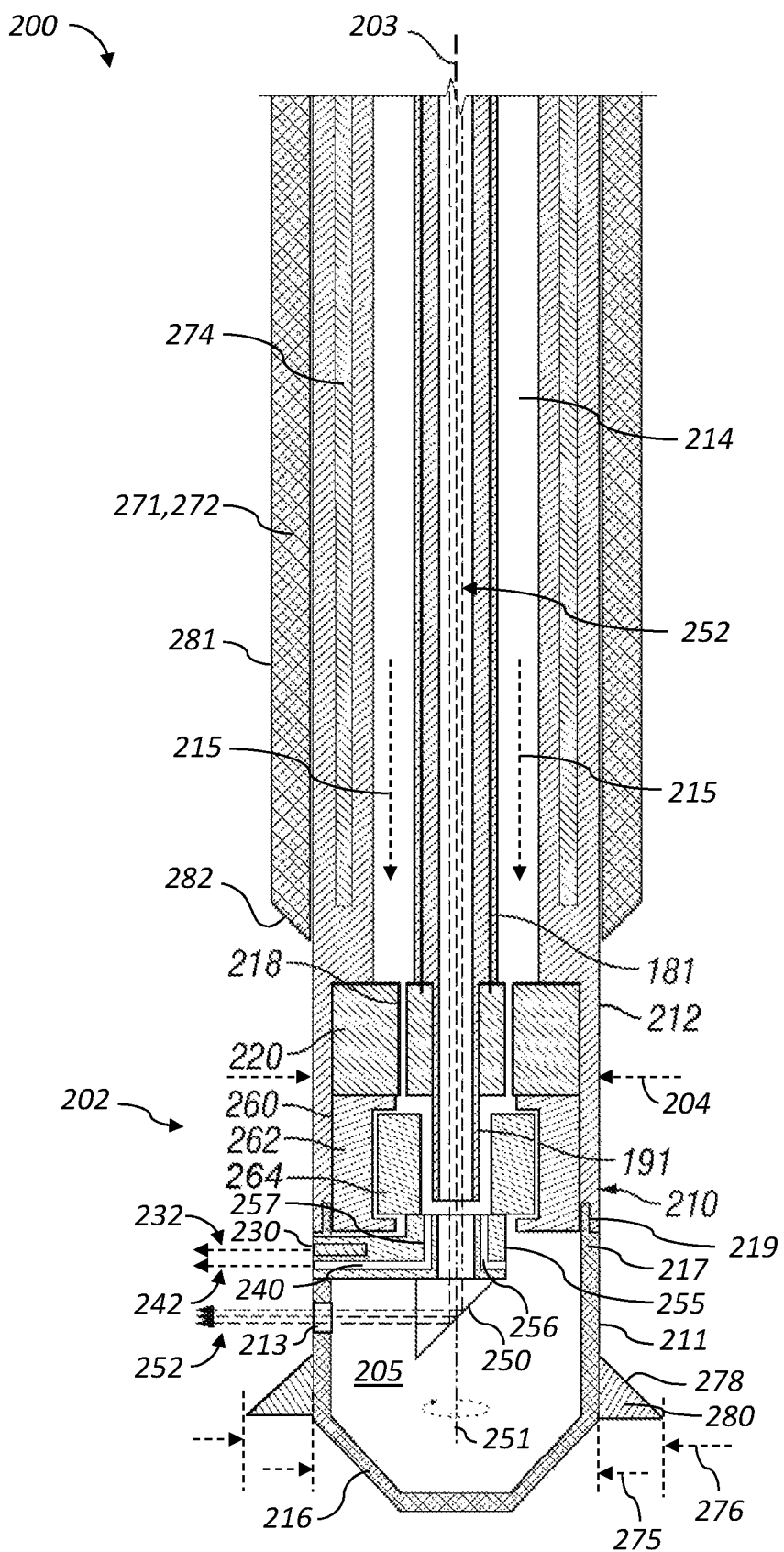
FIG. 2 is a schematic sectional view of at least a portion of an example implementation of the apparatus shown in FIG. 1 according to one or more aspects of the present disclosure.

FIG. 2 is schematic sectional view of at least a portion of an example implementation of the downhole tool 200 shown in FIG. 1 according to one or more aspects of the present disclosure. The following description refers to FIGS. 1 and 2, collectively.

The downhole tool 200 comprises a laser cutting apparatus 202 operable to receive a laser beam 252 from the laser source 190 and direct the laser beam 252 upon the sidewall 121 of the wellbore 120 in the open-hole implementation or the inner surface 123 of the completion/production tubular 114 or the casing 122 in the cased-hole implementation to remove the damaged portion of the sidewall 121 or the inner surface 123 designated for repair. Accordingly, the laser cutting apparatus 202 may cut one or more radial slots along the damaged portion of the sidewall 121 or the inner surface 123, such as may extend into or through the completion/production tubular 114, the casing 122, the cement sheath 124, and/or the formation 130 around the wellbore 120.

The laser cutting apparatus 202 includes a housing 210, which defines an internal space 205 and a fluid pathway 214 within the downhole tool 200. The housing 210 may comprise a lower housing 211 and an upper housing 212. The upper housing 212 may couple the downhole tool 200 with one of the tools 112 of the tool string 110 and/or with the coiled tubing 161, such as may facilitate communication of the surface fluid, the electrical power, the electrical signals, and/or the laser beam 252 to the downhole tool 200. For example, the upper housing 212 may be operable to receive therein or couple with the coiled tubing 161, such as to permit communication of the surface fluid from the fluid source 140 to the downhole tool 200. The upper housing 212 may be further operable to receive therein the electrical conductor 181, such as to permit communication of the electrical power and/or signals from the control center 180 to the downhole tool 200. The upper housing 212 may also be operable to receive therein or couple with the optical conductor 191, such as to facilitate transmission of the laser beam 252 from the laser source 190 to the downhole tool 200.

The lower housing 211 may be rotationally coupled with the upper housing 212 in a manner permitting the lower housing 211 to rotate relative to the upper housing 212, such as about an axis of rotation 251, which may substantially coincide with a longitudinal central axis 203 of the downhole tool 200. The lower housing 211 may be disposed at a downhole end of the downhole tool 200, and may comprise a bowl-shaped or other configuration having an open end 217 and a closed end 216. The open end 217 may be rotationally engaged or otherwise coupled with the upper housing 212, such as to permit the above-described rotation of the lower housing 211 relative to the upper housing 212. For example, the open end 217 of the lower housing 211 may be coupled with the upper housing 212 via a sliding joint 219. The closed end 216 of the lower housing 211 may be rounded, sloped, tapered, pointed, beveled, chamfered, and/or otherwise shaped with respect to the central axis 203 of the downhole tool 200 in a manner that may decrease friction forces between the downhole tool 200 and the sidewall 121 or the inner surface 123 and/or wellbore fluid as the tool string 110 is conveyed downhole.

The lower housing 211 may enclose internal components of the downhole tool 200 and/or prevent the wellbore fluid from leaking into the interior space 205. The lower housing 211 may further comprise a window 213 that may permit transmission of the laser beam 252 from within the downhole tool 200 to a region external to the downhole tool 200. The window 213 may include an optically transparent material, such as glass or a transparent polymer, or the window 213 may be an aperture extending through a sidewall of the lower housing 211. The window 213 may have a substantially circular, rectangular, or other geometry, or may extend circumferentially around the entire lower housing 211.

During laser cutting operations, the internal space 205 of the lower housing 211 may be filled with the surface fluid communicated through the coiled tubing 161, such as to permit uninterrupted transmission of the laser beam 252 through the internal space 205 and/or to equalize internal pressure of the downhole tool 200 with hydrostatic wellbore pressure. However, instead of being filled with the surface fluid, the internal space 205 may be filled with gas, such as nitrogen, or may be substantially evacuated (e.g., at a vacuum), among other implementations permitting substantially uninterrupted transmission of the laser beam 252 through the internal space 205.

A deflector 250 may be included within the internal space 205 to direct the laser beam 252 through the window 213 to be incident upon intended locations along the sidewall 121 or the inner surface 123, including via rotation about the axis of rotation 251. For example, the downhole tool 200 may comprise a motor 260 operable to rotate the deflector 250 to control the rotational or angular direction or position of the deflector 250. The motor 260 may comprise a stator 262 and a rotor 264. The stator 262 may be fixedly coupled with respect to the upper housing 212, and the rotor 264 may be coupled with or otherwise carry and thus rotate the deflector 250. For example, an intermediate member 255 may be coupled with or otherwise rotate with the rotor 264, and the deflector 250 may be coupled or otherwise carried with the intermediate member 255. The intermediate member 255 may comprise an optical passage or other opening permitting the laser beam 252 to pass from the optical conductor 191 to the deflector 250.

The deflector 250 is or comprises a light deflecting member operable to direct the laser beam 252 emitted from the optical conductor 191 through the window 213 upon the sidewall 121 or the inner surface 123. The deflector 250 may be or comprise a lens, a prism, a mirror, or another light deflecting member. Although depicted as a single light deflecting member, the deflector 250 may comprise two or more prisms or mirrors, or the deflector 250 may comprise a rhomboid prism, among other example implementations within the scope of the present disclosure.

As described above, the upper housing 212 may be operable to receive therein or couple with the coiled tubing 161 to direct the surface fluid along the fluid pathway 214 within the downhole tool 200, as indicated in FIG. 2 by arrows 215. Thereafter, the surface fluid may be directed by additional fluid pathways 218 toward the intermediate member 255, which may direct the surface fluid into the internal space 205 and/or out of the downhole tool 200. The intermediate member 255 may comprise a fluid pathway 256 directing the surface fluid from the fluid pathway 218 into the internal space 205. At least a portion of the intermediate member 255 may extend radially outwards through the lower housing 211, and this or another portion of the intermediate member 255 may comprise a fluid pathway 257 directing the surface fluid from the fluid pathway 218 to outside of the lower housing 211. The fluid pathway 257 may terminate with a fluid nozzle 240 and/or other means operable to form a stream 242 of surface fluid expelled from the fluid pathway 257. Although the nozzle 240 is depicted in FIG. 2 as being flush with the exterior of the lower housing 211, the nozzle 240 may also protrude outward from the exterior of the lower housing 211.

The intermediate member 255 may also operatively couple the rotor 264 and the lower housing 211, such as may permit the motor 260 to rotate the lower housing 211. The connection between the intermediate member 255 and the rotor 264 further permits the motor 260 to simultaneously rotate the deflector 250 and direct the nozzle 240 in the same direction. That is, the nozzle 240 and the deflector 250 may be angularly aligned, relative to rotation around the axis of rotation 251, such that the nozzle 240 may direct the fluid stream 242 in substantially the same direction that the deflector 250 directs the laser beam 252 (e.g., within about five degrees from each other). Although the nozzle 240 is shown forming the stream 242 flowing parallel with respect to the laser beam 252, the nozzle 240 may form the fluid stream 242 flowing diagonally with respect to the laser beam 252 or along a radial path that at least partially overlaps or coincides with a radial path of the laser beam 252.

Accordingly, during or after the laser cutting operations, the fluid stream 242 may be directed into the radial slots or the fluid stream 242 may impact a portion of the completion/production tubular 114, the casing 122, the cement sheath 124, and/or the formation 130 that is being cut by the laser beam 252 to flush out particles, dust, fumes, and/or other contaminants (hereafter collectively referred to as "contaminants") formed during the laser cutting operations. The fluid stream 242 may also displace contaminants and wellbore fluid from a region generally defined by the path of the laser beam 252, such as may aid in preventing the contaminants and wellbore fluid from diffusing or otherwise interfering with the laser beam 252.

The surface fluid communicated from the fluid source 140 via the coiled tubing 161 and expelled through the nozzle 240 may be substantially transparent to the laser beam 252. For example, the surface fluid may comprise nitrogen, water with an appropriate composition and salinity, and/or another fluid that does not deleteriously interfere with and/or alter the laser beam 252. The fluid composition may depend on the wavelength of the laser beam 252. For example, the spectrum of absorption of water for infrared light may have some wavelength intervals where water is substantially transparent to the laser beam 252. Accordingly, the downhole tool 200 may be operable to emit the laser beam 252 having a wavelength that may be transmitted through the water with little or no interference.

During or after the laser cutting operations, a depth sensor 230 may be utilized to detect the damaged portion of the sidewall 121 or the inner surface 123 and/or monitor or otherwise determine a depth or geometry of the radial slots formed by the laser beam 252. The depth sensor 230 may be operatively connected with the motor 260, such as may permit the motor 260 to control the angular position of the depth sensor 230 in an intended direction. For example, the depth sensor 230 may be coupled with or otherwise carried by the intermediate member 255. The depth sensor 230 and the deflector 250 may be angularly aligned, relative to rotation around the axis 251, such that a sensing direction of the depth sensor 230 and the direction of the laser beam 252 deflected by the deflector 250 may be substantially similar (e.g., within about five degrees of each other). Thus, the depth sensor 230 may be operable to detect the depth of the radial slot in real-time as the radial slot is being cut by the laser beam 252.

The depth sensor 230 may comprise a signal emitter operable to emit a sensor signal 232 directed toward the sidewall 121 or the inner surface 123 and/or into the radial slot. The depth sensor 230 may further comprise a signal receiver operable to receive the sensor signal 232 after the sensor signal 232 is reflected back by the sidewall 121, the inner surface 123, or a radially outward end of the radial slot. The depth sensor 230 may be operable to calculate or determine damage along the sidewall 121 or the inner surface 123 and/or the penetration depth of the radial slot based on a duration of travel of the sensor signal 232 between the emitter and receiver. However, a controller 220 may also or instead be utilized to determine the damage along the sidewall 121 or the inner surface 123 and/or the penetration depth of the radial slot. For example, the depth sensor 230 may be in communication with the controller 220, such as to initiate emission of the sensor signal 232 by the controller 220 and to receive the returning sensor signal 232. Once the sensor signal 232 is transmitted and received, the controller 220 may be operable to determine the damage along the sidewall 121 or the inner surface 123 and/or penetration depth of the radial slot based on the received sensor signal 232 or based on the duration of travel of the sensor signal 232 from the emitter to the receiver, such as between a first time at which the sensor signal 232 is emitted from the depth sensor 230 and a second time at which the depth sensor 230 receives the reflected sensor signal 232. The penetration depth through the completion/production tubular 114, the casing 122, the cement sheath 124, and/or the formation 130 may be measured in real-time as the radial slot is being formed by the laser beam 252. Although the depth sensor 230 is shown emitting the sensor signal 232 parallel with respect to the laser beam 252, the depth sensor 240 may emit the sensor signal 232 diagonally with respect to the laser beam 252 or otherwise toward the sidewall 121 or the inner surface 123 or into the radial slot formed by the laser beam 252.

The depth sensor 230 may be an acoustic sensor operable to emit an acoustic signal upon the sidewall 121 or the inner surface 123 or into the radial slot and detect a reflection of the acoustic signal. The depth sensor 230 may also be an electromagnetic sensor operable to emit an electromagnetic signal upon the sidewall 121 or the inner surface 123 or into the radial slot and detect a reflection of the electromagnetic signal. The depth sensor 230 may also be a light sensor operable to emit a light signal upon the sidewall 121 or the inner surface 123 or into the radial slot and detect a reflection of the light signal.

The controller 220 may be connected with the electrical conductor 181 for transmitting and/or receiving electrical signals communicated between the controller 220 and the control center 180. The controller 220 may be operable to receive, process, and/or record the signals or information generated by and/or received from the control center 180, the downhole tool 200, and/or the one or more tools 112 of the tool string 110. For example, the controller 220 may be operable to receive and process signals from the CCL and/or orientation sensor(s) described above, such as to acquire the position and/or the orientation of the downhole tool 200. The controller 220 may be further operable to transmit the acquired position and/or orientation information to the control center 180 via the electrical conductor 181.

The downhole tool 200 may also carry or otherwise comprise a sealing material 271, 272 which may be disposed at least partially within or around the housing 210 of the laser cutting apparatus 202 or another portion of the downhole tool 200 in a manner permitting the sealing material 271, 272 to remain about the housing 210 during downhole conveyance operations. For example, the sealing material 271 (which may be referred to herein as "particulate sealing material") may be provided in a form of pellets, beads, or other solid particles, which may be operable to freely roll, flow, or otherwise move via gravity when not contained. If the particulate sealing material 271 is utilized, the sealing material 271 may be contained within a container 281, such as may be operable to maintain the sealing material 271 at least partially within or around the housing 210 of the laser cutting apparatus 202 or another portion of the downhole tool 200. The container 281 may comprise a hatch, a door, or another release mechanism 282 operable to release or otherwise permit the sealing material 271 to flow or move out of the container 281, such as by way of gravity. The sealing material 271 may also be supplied from the wellsite surface 105, such as via the coiled tubing 161. For example, the sealing material 271 may be communicated from the wellsite surface 105 into the container 281 or the sealing material 271 may be communicated from the wellsite surface 105 and directed directly into the radial slot during sealing operations.

The sealing material 272 (which may be referred to herein as "non-particulate sealing material") may also be provided in a solid state in a form of one or more rings (not shown) that are stacked or otherwise disposed about the upper housing 212, although other arrangements are also within the scope of the present disclosure.

The sealing material 271, 272 may be an alloy or other combination of elements, compounds, and/or other constituents in a solid state and having a melting temperature at which the sealing material 271, 272 flows in a liquid state. The sealing material 271, 272 resolidifies when cooled to a temperature below the melting temperature. In an example implementation of the downhole tool 200, the sealing material 271, 272 may be a eutectic material formulated such that the melting temperature of the eutectic material is lower than the melting temperatures of each of the individual constituents. The melting temperature of the eutectic material is known as a eutectic temperature. The eutectic temperature depends on the amounts and perhaps relative orientations of its constituents. The eutectic material may comprise a bismuth-based alloy, such as may substantially comprise about 58% bismuth and about 42% tin, by weight. However, other eutectic alloys are also within the scope of the present disclosure. The sealing material 271, 272 may be selected based on, for example, anticipated wellbore conditions and a well intervention operation to be performed with the downhole tool 200.

The sealing material 271, 272 may be melted by heating via electrical, chemical, and/or other heating means 274 located along or adjacent the sealing material 271, 272. The sealing material 271, 272 melts, transforming from a solid state to a liquid or melted state when heat from the heating means 274 is applied or otherwise transferred to the sealing material 271, 272. When in the melted state, the sealing material 271, 272 may be molded or otherwise formed to perform downhole sealing operations.

The heating means 274 may comprise one or more electrical heating coils or other elements (not shown) disposed substantially along the length of the sealing material 271, 272, whether within the upper housing 212 or between the upper housing 212 and the sealing material 271, 272. The electrical power may be provided to the heating means 274 via one or more electrical conductors 181. The tool string 110 may also comprise an internal alternator or generator (not shown) for generating heat or electrical energy to heat the sealing material 271, 272.

The heating means 274 may also or instead comprise one or more thermites and/or other heat-generating chemical elements, such as may be disposed in solid or powder form substantially along the length of the sealing material 271, 272, whether within the upper housing 212 or between the upper housing 212 and the sealing material 271, 272. The heat-generating chemical elements may be activated to generate heat via chemical reaction, thus melting the sealing material 271, 272.

The downhole tool 200 may also utilize the laser beam 252 to melt the sealing material 271, 272. For example, the non-particulate sealing material 272 and the laser cutting apparatus 202 may be movable with respect to each other such that the laser beam 252 may be directed upon the sealing material 272 to heat the sealing material 272 to at least the melting temperature. In an embodiment of the downhole tool 200, the sealing material 272 may be axially movable about the upper housing 212 such that at least a portion of the sealing material 272 may be positioned along the path of the laser beam 252 exiting the window 213 such that the laser beam 252 is directed upon the sealing material 272. In an embodiment of the downhole tool 200, the laser cutting apparatus 202 may be axially movable or retractable within the sealing material 272 such that the window 213 is positioned within the sealing material 272 and the laser beam 252 is directed upon the sealing material 272.

Although the sealing material 271, 272 is shown disposed around the upper housing 212 of the laser cutting apparatus 202 and the heating means 274 is shown disposed within the upper housing 212, it is to be understood that the sealing material 271, 272 and the heating means 274 may be implemented as part of another portion of the downhole tool 200. The sealing material 271, 272 and the heating means 274 may also be or comprise a portion of another tool 112 coupled within the tool string. For example, the sealing material 271, 272 and the heating means 274 may be disposed around and within a mandrel of another tool 112 coupled uphole or downhole with respect to the laser cutting apparatus 202.

A portion of the downhole tool 200 located downhole from the sealing material 271, 272 and/or the window 213 may comprise an outer diameter 276 that is larger than an outer diameter 204 of the rest of the downhole tool 200, such as the housing 210. The downhole portion of the downhole tool 200 may be or comprise a radially protruding member or spreader 280 having a surface 278 transitioning between the outer diameters 204, 276. The surface 278 of the spreader 280 may be operable to urge the flowing sealing material 271, 272 radially outward toward the sidewall 121 or the inner surface 123, such as to provide a path for the flowing sealing material 271, 272. The outer diameter 276 of the spreader 280 may be slightly smaller than or substantially equal to an inner diameter 118 of the sidewall 121 in the open-hole implementation or the outer diameter 276 may be slightly smaller than or substantially equal to an inner diameter 119 of the inner surface 123 in the cased-hole implementation. The surface 278 may be a substantially frustoconical surface extending diagonally or axially tapered with respect to the central axis 203 of the downhole tool 200. The surface 278 may extend circumferentially and/or substantially continuously around the lower housing 211.

The spreader 280 may be fixedly disposed downhole from the sealing material 271, 272 and/or the window 213 or the spreader 280 may be movable between a retracted position (shown in FIG. 4-7) and an expanded position (shown in FIG. 2). In the retracted position, the spreader 280 comprises an outer diameter 275 that may be substantially smaller than the outer diameter 276 when the spreader 280 is in the expanded position. When in the retracted position, the outer diameter 275 of the spreader 280 may be substantially equal to the outer diameter 204 of the housing 210. When in the expanded position, the outer diameter 276 of the spreader 280 may be slightly smaller than or substantially equal to the inner diameter 118 of the sidewall 121 or the outer diameter 276 may be slightly smaller than or substantially equal to the inner diameter 119 of the inner surface 123.

The spreader 280 may comprise one or more flexible scoopers, bristles, and/or other filaments (not shown) operable to distribute or shape the melted sealing material 271, 272. The spreader 280 may be substantially solid or may comprise recesses, holes, fins, and/or other heat-dissipating features (not shown) extending into or from the spreader 280. Such features may aid in absorbing heat from the melted sealing material 271, 272 and/or in transferring heat from the melted sealing material 271, 272 to the lower housing 211 and/or surrounding environment, which may include water and/or other fluids within the wellbore 120.

Although shown as being integral with the lower housing 211, the spreader 280 may be a separate and distinct portion of the downhole tool 200 connected to the lower housing 211. Furthermore, although the spreader 280 is shown disposed in connection with the lower housing 211, the spreader 280 may be connected with another portion of the downhole tool 200 downhole from the sealing material 271, 272 and/or the window 213. The spreader 280 may also be or comprise a portion of another tool 112 coupled within the tool string 110 downhole from the sealing material 271, 272 and/or the laser apparatus 202.

Figure 3:
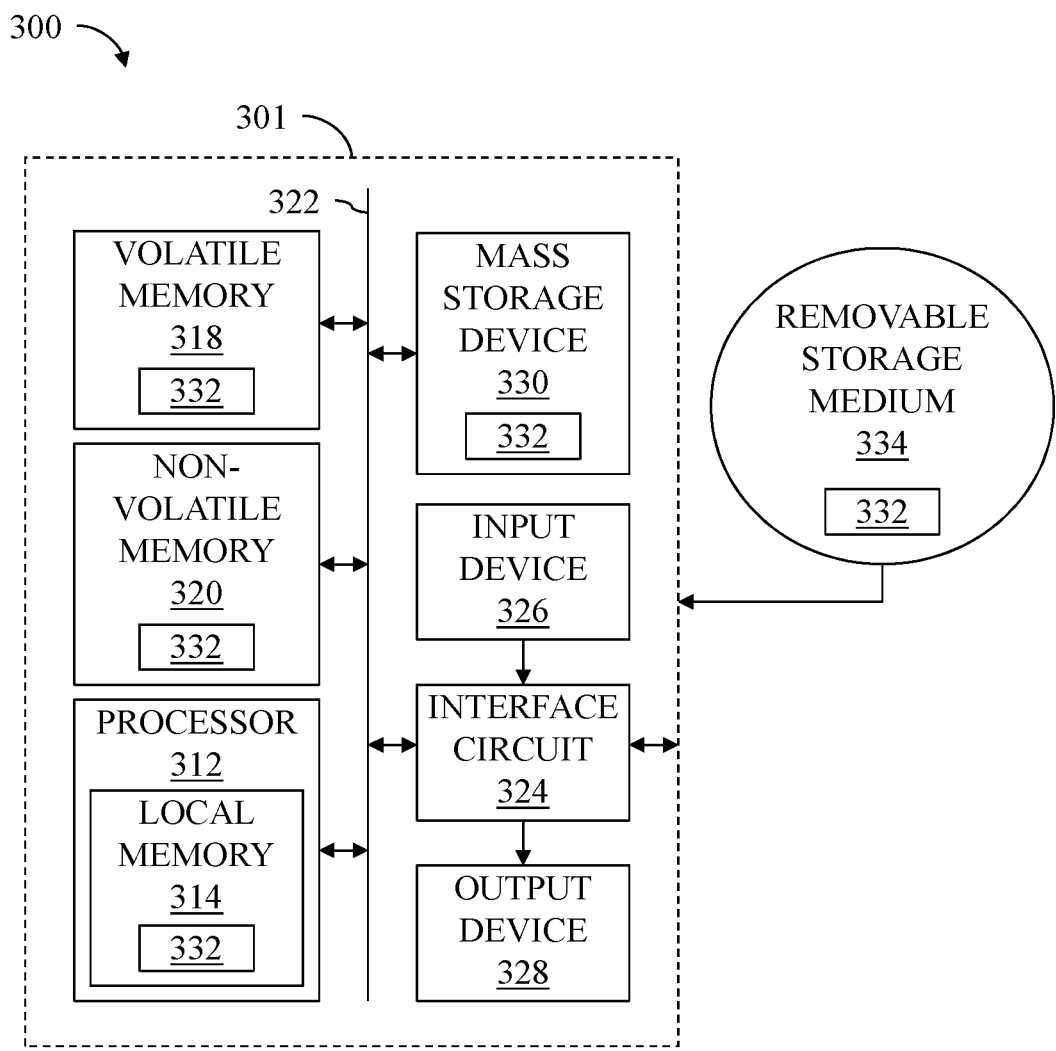
FIG. 3 is a schematic view of at least a portion of an example implementation of apparatus according to one or more aspects of the present disclosure.

FIG. 3 is a schematic view of at least a portion of an example implementation of an apparatus 300 according to one or more aspects of the present disclosure. The apparatus 300 may be or form a portion of the control center 180 shown in FIG. 1 and/or the controller 220 shown in FIG. 2, and may thus be operable to facilitate at least a portion of a method and/or process according to one or more aspects described above.

The apparatus 300 is or comprises a processing system 301 that may execute example machine-readable instructions to implement at least a portion of one or more of the methods and/or processes described herein. For example, the processing system 301 may be operable to receive, store, and/or execute computer programs or coded instructions 332, such as may cause the downhole tool 200 and/or other components of the tool string 110 and the wellsite system 100 to perform at least a portion of a method and/or process described herein. The processing system 301 may be programmed or otherwise receive the coded instructions 332 at the wellsite surface 105 prior to conveying the downhole tool 200 within the wellbore 120. The processing system 301 may also be programmed with information related to quantity and location, and other parameters related to formation of the radial slots. The processing system 301 may also be programmed with a predefined radial slot geometry and/or the processing system 301 may be programmed to form the radial slots based on geometry of the damaged portions of the sidewall 121 and/or the side surface 123, including the completion/production tubular 114, the casing 122, the cement sheath 124, and/or the formation 130. Based on the information and/or coded instructions 332, the processing system 301 may be operable to control the downhole tool 200, including activating the laser source 190 (or indicating a "ready" status therefor), rotating the motor 260 to control the angular position of the deflector 250, the nozzle 240, and/or the depth sensor 230, and actuating the coiled tubing injector 171 to apply an uphole and downhole force to the coiled tubing 161 to advance and retract the downhole tool 200 within the wellbore 120. Therefore, the processing system 301, including the programmed information and/or coded instructions 332, may facilitate a substantially automatic radial slot formation process, perhaps with no or minimal interaction or communication with a human operator at the wellsite surface 105.

The processing system 301 may be or comprise, for example, one or more processors, controllers, special-purpose computing devices, servers, personal computers, personal digital assistant (PDA) devices, smartphones, smart glasses, tablets, internet appliances, and/or other types of computing devices. The processing system 301 may comprise a processor 312, such as, for example, a general-purpose programmable processor. The processor 312 may comprise a local memory 314, and may execute the coded instructions 332 present in the local memory 314 and/or another memory device. The processor 312 may execute, among other things, machine-readable instructions or programs to implement the methods and/or processes described herein. The processor 312 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 312 may be in communication with a main memory, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 320 may be, comprise, or be implemented by read-only memory, flash memory and/or other types of memory devices. One or more memory controllers (not shown) may control access to the volatile memory 318 and/or the non-volatile memory 320.

The processing system 301 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 324 may also comprise a graphics driver card. The interface circuit 324 may also comprise a device, such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 326 may be connected to the interface circuit 324. The input device(s) 326 may permit a user to enter data and commands into the processor 312. The input device(s) 326 may be, comprise, or be implemented by, for example, a keyboard, a mouse, a touchscreen, a track-pad, a trackball, an isopoint, and/or a voice recognition system, among others.

One or more output devices 328 may also be connected to the interface circuit 324. The output devices 328 may be, comprise, or be implemented by, for example, display devices (e.g., a light-emitting diode (LED) display, a liquid crystal display (LCD, or a cathode ray tube (CRT) display, among others), printers, and/or speakers, among others.

The processing system 301 may also comprise one or more mass storage devices 330 for storing machine-readable instructions and data. Examples of such mass storage devices 330 include floppy disk drives, hard drive disks, compact disk (CD) drives, and digital versatile disk (DVD) drives, among others. The coded instructions 332 may be stored in the mass storage device 330, the volatile memory 318, the non-volatile memory 320, the local memory 314, and/or on a removable storage medium 334, such as a CD or DVD. Thus, the modules and/or other components of the processing system 301 may be implemented in accordance with hardware (embodied in one or more chips including an integrated circuit, such as an ASIC), or may be implemented as software or firmware for execution by a processor. In the case of firmware or software, the embodiment may be provided as a computer program product including a computer readable medium or storage structure embodying computer program code (i.e., software or firmware) thereon for execution by the processor.

FIGS. 4-10 are sectional views of the downhole tool 200 shown in FIG. 2 disposed in the wellbore 120 during different stages of operation according to one or more aspects of the present disclosure. The downhole tool 200 is depicted as being disposed within a cased-hole implementation of the wellbore 120, which does not include the completion/production tubing 114. Accordingly, the inner surface 123 in FIGS. 4-10 comprises the inner surface of the casing 122. The inner surface 123 and the sidewall 121 are shown having a damaged portion 284, which extends through the casing 122, the cement sheath 124, and into the formation 130. The following description refers to FIGS. 1 and 4-10, collectively.

Figure 4:
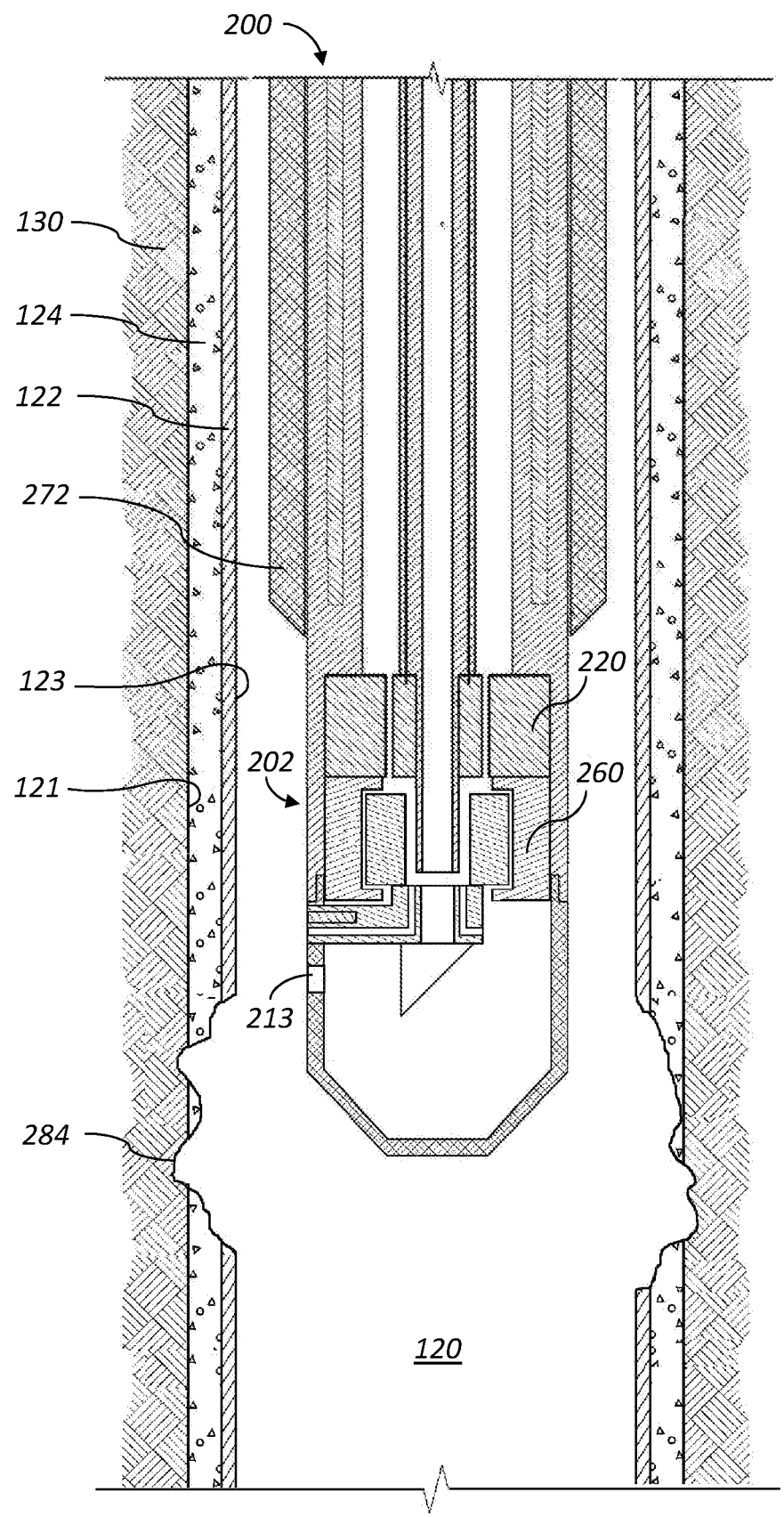
FIGS. 4 and 5 are schematic sectional views of the apparatus shown in FIG. 2 during different stages of operation according to one or more aspects of the present disclosure.

During the laser cutting operations in which one or more damaged portions 284 are to be removed, the downhole tool 200 may be conveyed to the damaged portion 284 of the wellbore 120. The coiled tubing injector 171 may convey the tool string 110 with the downhole tool 200 such that the window 213 of the laser cutting apparatus 202 is located at an uphole end of the damaged portion 284, as shown in FIG. 4. When such position is reached, the laser source 190 may be activated to transmit the laser beam 252 to the laser cutting apparatus 202. The laser beam 252, directed by the deflector 250, may then be utilized to remove or cut a portion of the casing 122, the cement sheath 124, and/or the formation 130 along the damaged portion 284 of the wellbore 120.

Figure 5:
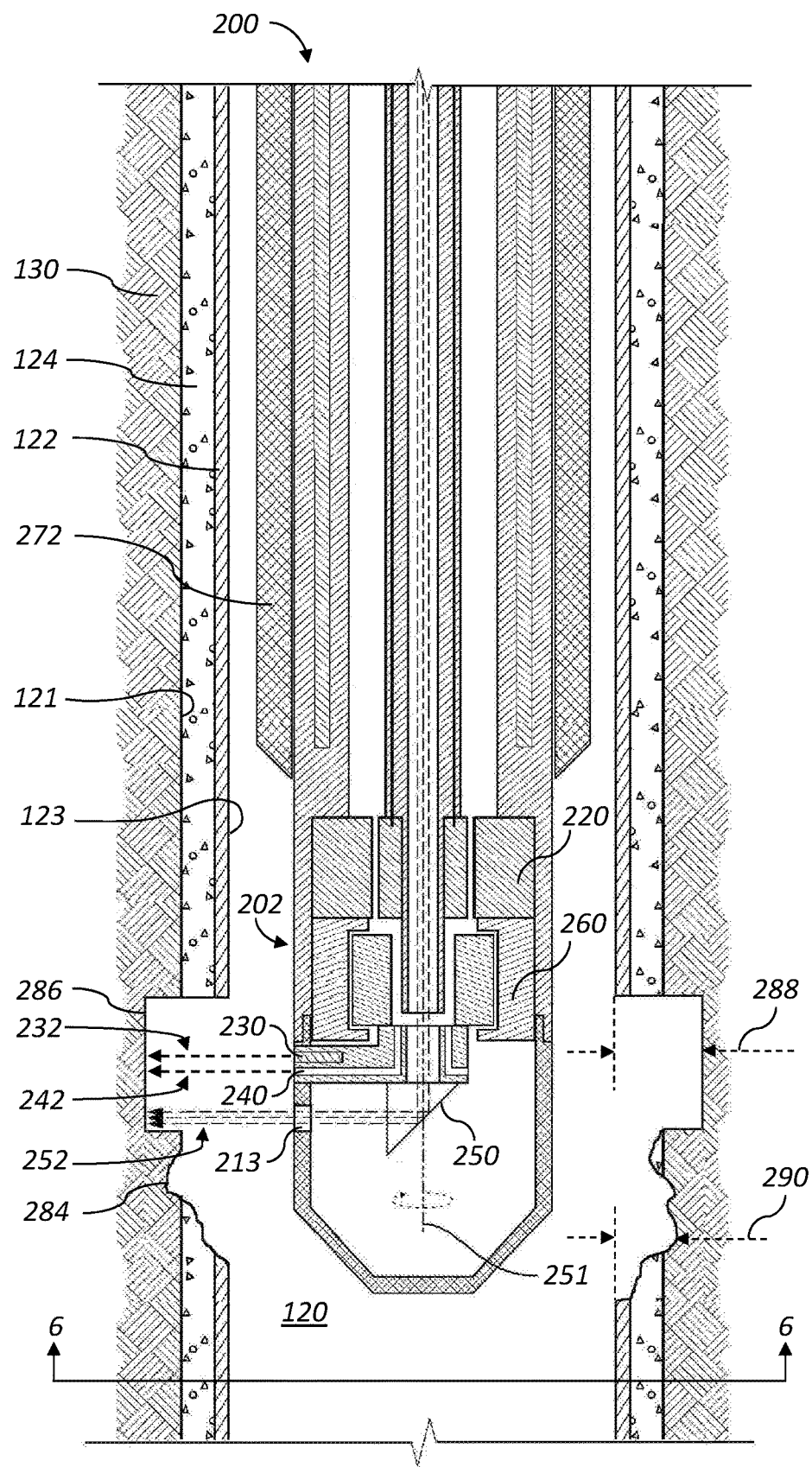
Figure 6:
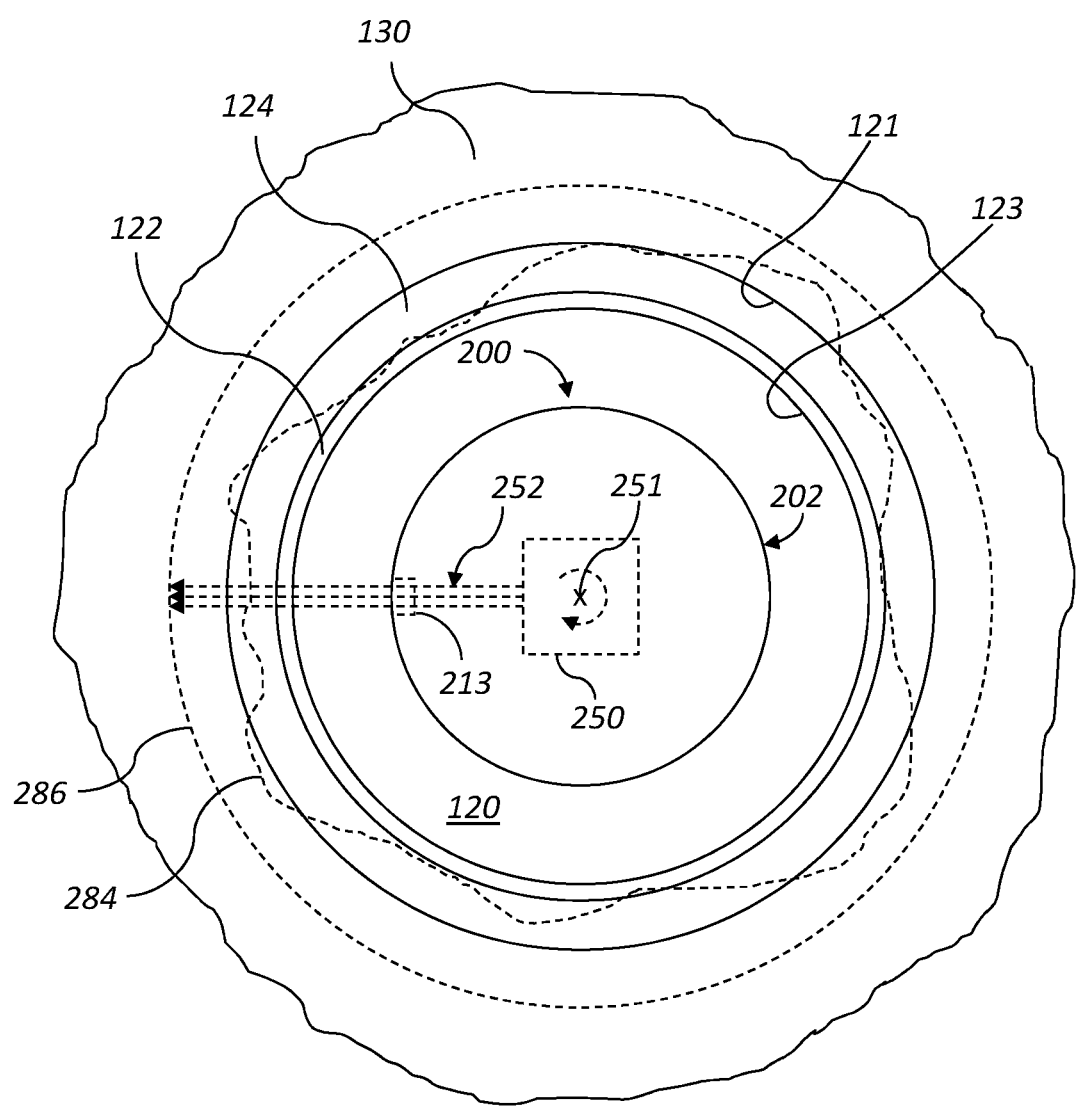
FIG. 6 is an axial view of the apparatus shown in FIG. 5 according to one or more aspects of the present disclosure.

As shown in FIGS. 5 and 6, the laser beam 252 may form one or more cavities or radial slots 286 along the damaged portion 284 of the wellbore 120. The deflector 250 may be rotated about the axis of rotation 251 through a predetermined angle to form the radial slot 286 having an angular sector geometry along the entire damaged portion 284 or multiple damaged portions of the wellbore 120. If the damaged portion 284 extends around the entire inner surface 123, the deflector 250 may be rotated 360 degrees to form a continuous or substantially continuous 360-degree slot 286 along the entire damaged portion 284, as shown in FIG. 6. The radial slot 286 may be formed to a depth 288, which may be substantially the same as or greater than a depth 290 of the damaged portion 284. If the damaged portion 284 extends axially (i.e., vertically) along the wellbore 120, the radial slot 286 may be extended axially by causing the coiled tubing injector 171 to move the tool string 110, including the laser cutting apparatus 202, along the wellbore 120 in the downhole direction until the window 213 is positioned at the next portion of the damaged portion 284 that has not been removed. Once the window 213 is positioned at the intended location, the laser beam 252 may be reactivated and rotated through the intended angle to extend the radial slot 286 axially. It is to be understood that the radial slot 286 may also be formed in a continuous manner, wherein the deflector 250 is rotated through the intended angle while the laser cutting apparatus 202 is moved axially along the wellbore 120. It is to be further understood that the radial slot 286 may be initiated at a downhole end of the damaged portion 284 and the laser cutting apparatus 202 may be moved in the uphole direction to extend the radial slot 286 axially.

As the laser cutting apparatus 202 is forming the radial slot 286, the fluid source 140 may be activated to introduce the surface fluid into the downhole tool 200, causing the fluid stream 242 to be discharged from the nozzle 240. As described above, the fluid stream 242 may clean the radial slot 286, such as by flushing out contaminants formed during the laser cutting operations.

As the laser cutting apparatus 202 is forming the radial slot 286, the depth sensor 230 may be activated to detect the damaged portion 284 of the wellbore 120 along the inner surface 123 and/or monitor the depth 288 or geometry of the radial slot 286. As described above, the depth sensor 230 may transmit the sensor signal 232 upon the damaged portion 284 and receive the sensor signal 232 that is reflected by the radially outward end of the damaged portion 284 to identify or determine the location, geometry, and/or depth 290 of the damaged portion 284. The depth sensor 230 may also transmit the sensor signal 232 into the radial slot 286 and receive the sensor signal 232 that is reflected by the radially outward end of the radial slot 286 to identify or determine the geometry or depth 288 of the radial slot 286. After the depth 288 or geometry of the radial slot 286 is known, the controller 220 may be operable to cause the motor 260 to rotate the deflector 250 based on the determined depth 288. For example, the controller 220 may be operable to slow down the motor 260 to decrease angular velocity of the deflector 250 and, thus, decrease the angular velocity of the laser beam 252. Such decrease may be based on the determined depth 288 to, for example, deliver a substantially constant amount of laser energy per unit length of the casing 122, the cement sheath 124, and/or the formation 130 being cut.

Figure 7:
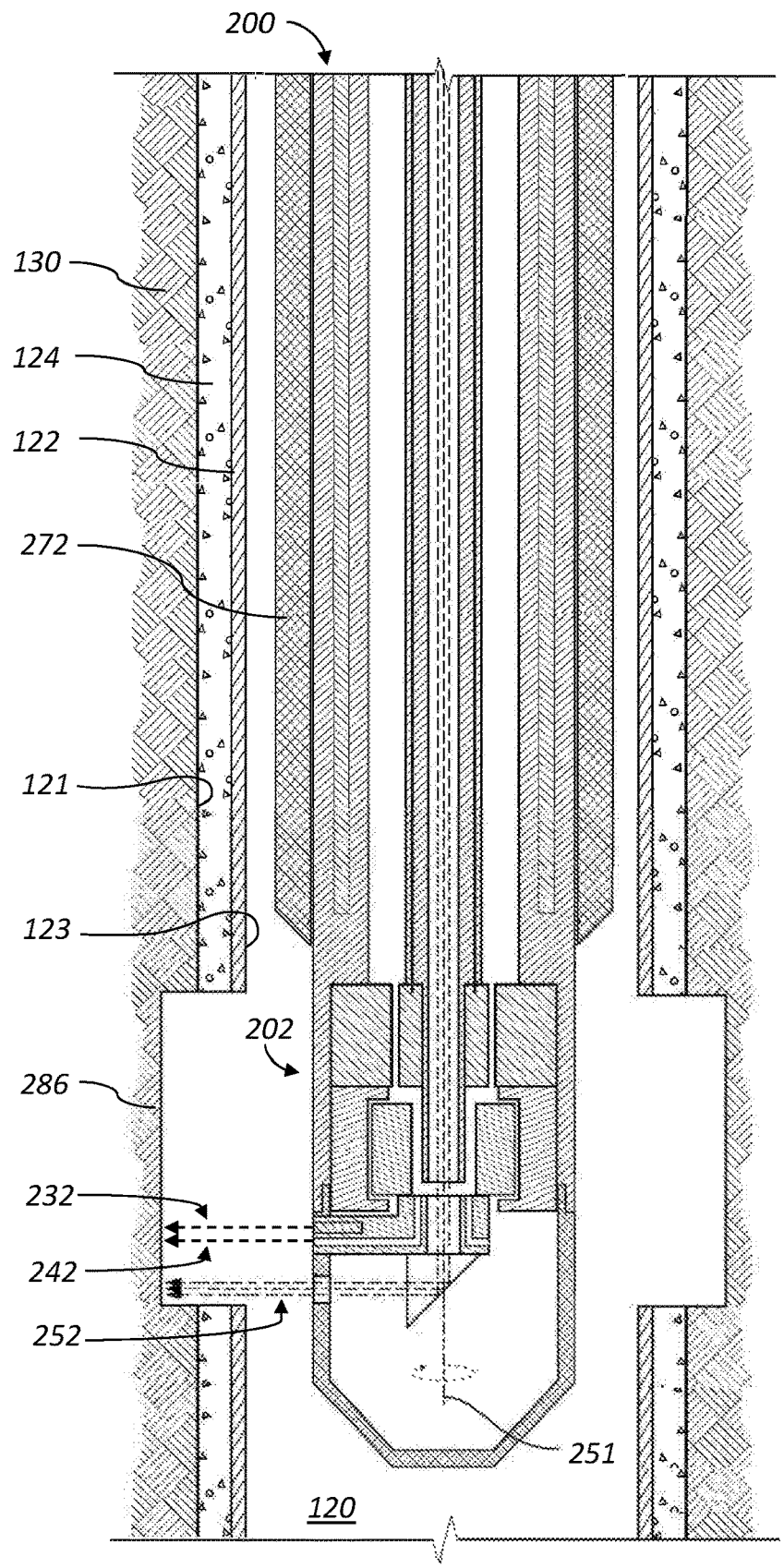
FIGS. 7-13 are schematic sectional views of the apparatus shown in FIG. 2 during different stages of operation according to one or more aspects of the present disclosure.

The coiled tubing injector 171 may move the tool string 110, including the laser cutting apparatus 202, along the wellbore 120 in the downhole direction until the radial slot 286 is formed along the entire axial length of the damaged portion 284, as shown in FIG. 7.

Figure 8:
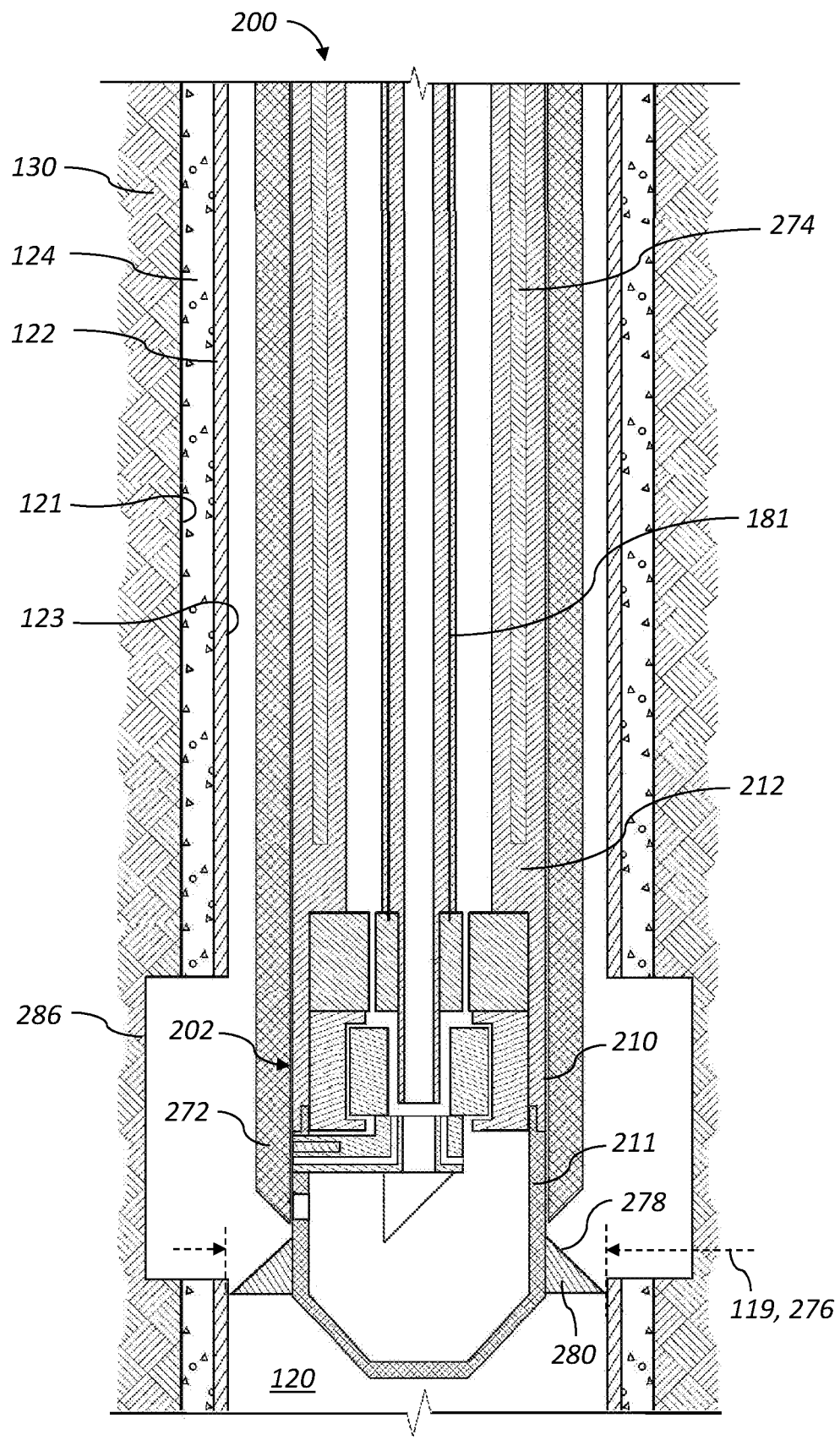

When the damaged portion 284 of the casing 122, the cement sheath 124, and/or the formation 130 has been removed to form the intended radial slot 286, a sealing operations may commence. As shown in FIG. 8, the axial position of the downhole tool 200 may be adjusted such that a radially outward end of the spreader 280 and/or the spreader surface 278 is located at or slightly below a downhole end of the radial slot 286. If the spreader 280 is retractable, the spreader 280 may be actuated to its expanded position such that its outer diameter 276 is slightly smaller than or substantially equal to the inner diameter 119 of the inner surface 123. The spreader 280 may also be actuated to its expanded position such that its outer diameter 276 is slightly smaller than or substantially equal to the inner diameter 118 of the sidewall 121, if the downhole tool 200 is utilized in the open-hole implementation of the wellbore 120.

In the implementation of the downhole tool 200 utilizing the non-particulate sealing material 272, the sealing material 272 and/or the laser cutting apparatus 202 may be axially moved with respect to each other such that at least a portion of the sealing material 272 may be positioned along the window 213 or otherwise along the path of the laser beam 252. As further shown in FIG. 8, the sealing material 272 may be axially moved in the downhole direction about the housing 210 of the laser cutting apparatus 202 such that at least a portion of the sealing material 272 may be positioned along the window 213 and, thus, along the path of the laser beam 252 exiting the window 213.

Figure 9:
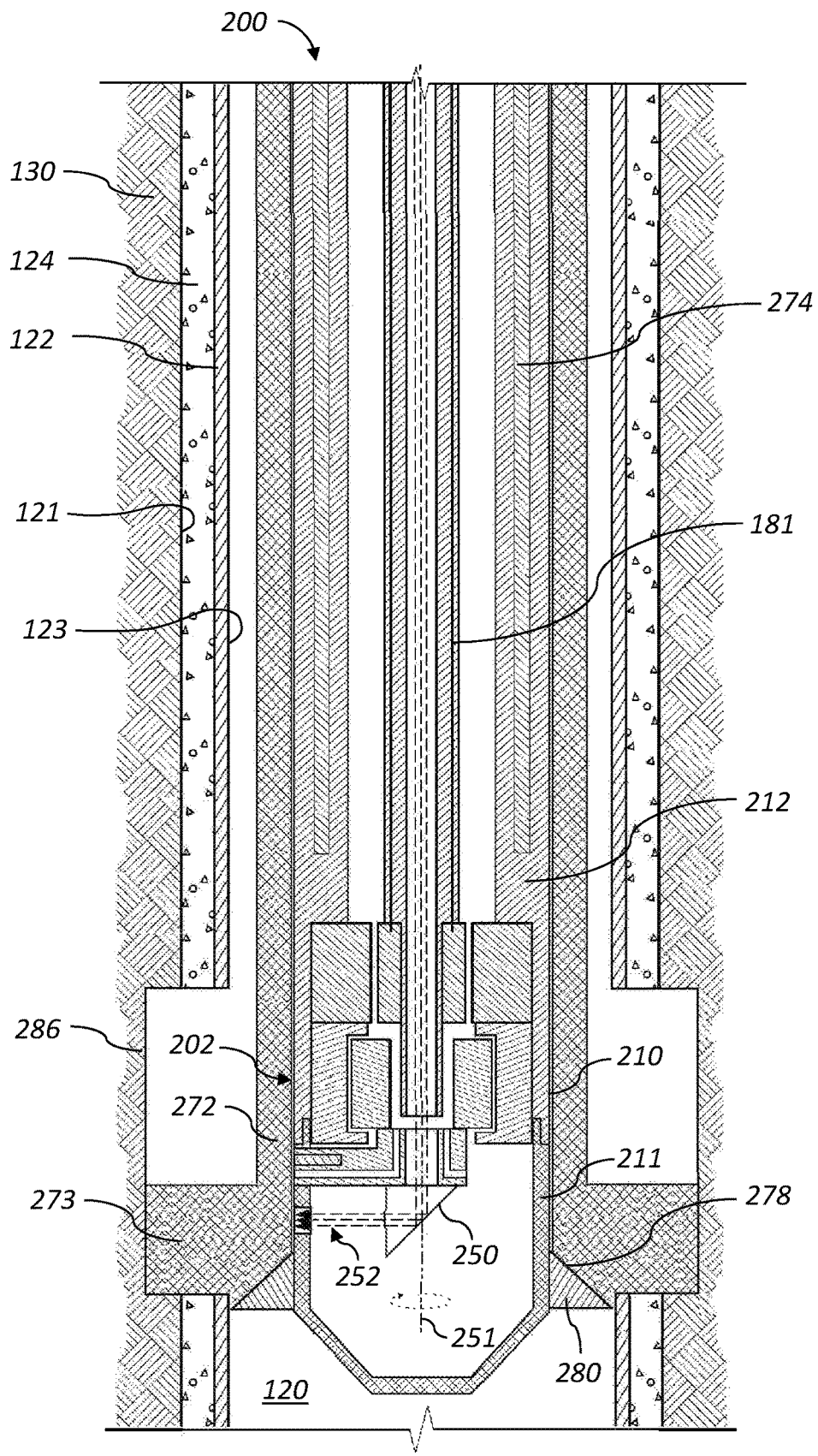

Once the sealing material 272 is positioned along the window 213 or otherwise along the path of the laser beam 252, the laser source 190 may be activated to transmit the laser beam 252 to the laser cutting apparatus 202, as shown in FIG. 9. The laser beam 252, directed by the deflector 250 at the sealing material 272, may then increase the temperature of the sealing material 272 until it melts. The melted sealing material 273 may flow in a downhole direction and be urged radially outward by the surface 278 of the spreader 280. The deflector 250 may rotate about the axis of rotation 251 to melt the sealing material 272 disposed around the housing 210. As the sealing material 272 is melted, the melted sealing material 273 is urged or flows radially outward into the radial slot 286 to progressively fill the radial slot 286.

Figure 10:
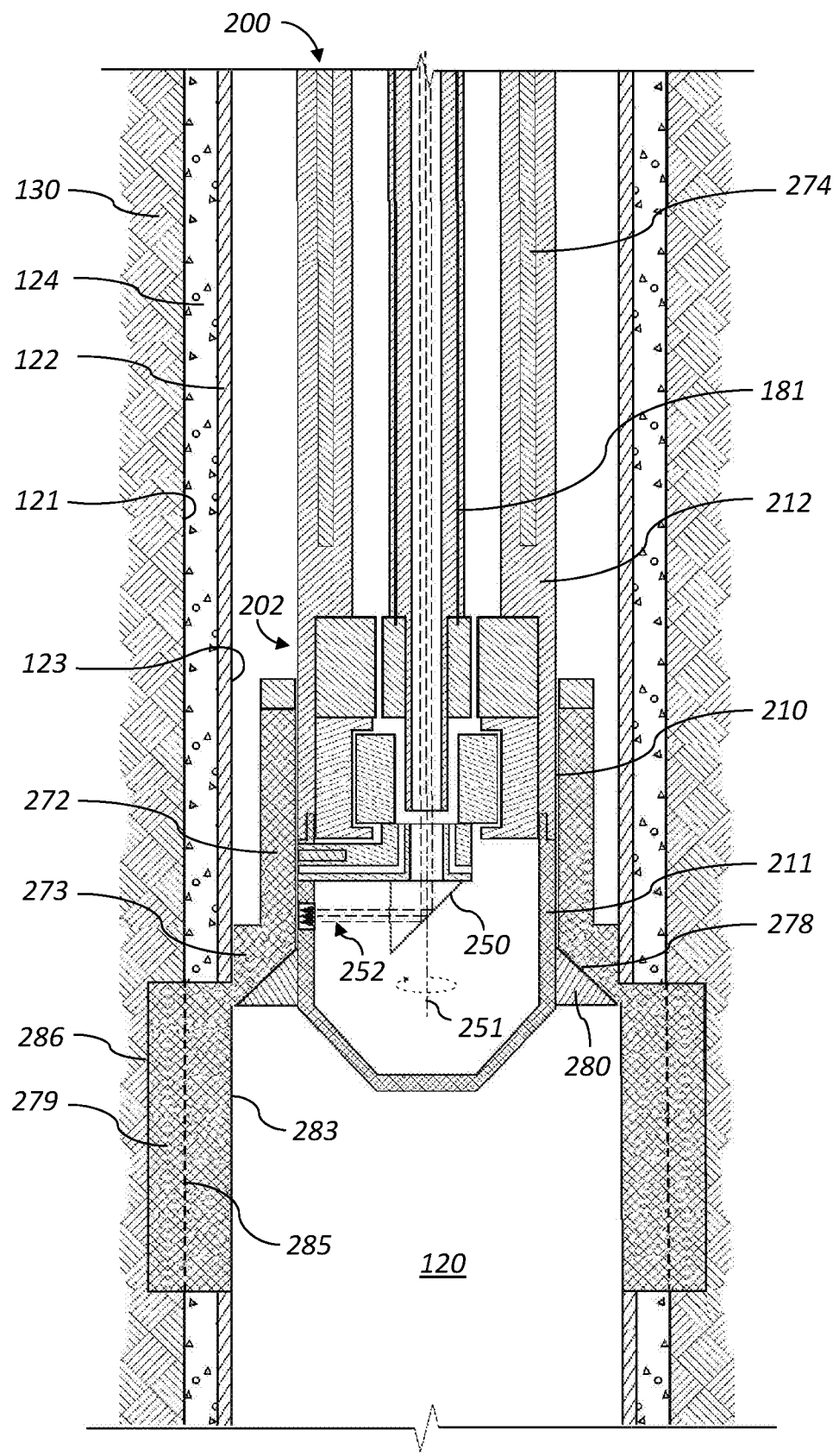

As further shown in FIG. 10, prior to or after the radial slot 286 is filled with the melted sealing material 273, the coiled tubing injector 171 may be activated to move the tool string 110, including the laser cutting apparatus 202, along the wellbore 120 in the uphole direction. As the downhole tool 200 moves uphole, the spreader 280 may further urge the melted sealing material 273 into the radial slot 286. The spreader 280, the housing 210, and/or another portion of the tool string 110 that contacts the melted sealing material 273 absorb heat from the melted sealing material 273 and shape the melted sealing material 273 to include an inner surface 283 that is substantially continuous with the inner surface 123 of the casing 122. If the radial slot 286 was formed in the open-hole implementation of the wellbore 120, the downhole tool 200 will have shaped the melted sealing material 273 to form an inner surface 285 (shown in phantom lines) that is substantially continuous with the sidewall 121 of the wellbore 120.

The downhole tool 200 may be moved in the uphole direction at a speed that permits the melted sealing material 273 to cool to a temperature at which the viscosity and/or other properties of the melted sealing material 273 reach an intended level of solidity to permit shaping of the melted sealing material 273 as intended. The properties of the sealing material 273 may be selected such that the sealing material 273 chemically and/or otherwise bonds with the casing 122, the cement sheath 124, and/or the formation 130 and/or otherwise permits the sealing material 273 to be molded and/or otherwise shaped by the spreader 280. Accordingly, as the melted sealing material 273 cools and solidifies, the solidified sealing material 279 adheres to or remains within the radial slot 286 without further flowing downhole along the inner surface 123 of the casing 122 or otherwise deforming from the shape formed by the spreader 280. The solidified sealing material 279 may form a patch to seal the radial slot 286 and/or may provide the inner surface 283, which may permit subsequent downhole tool or fluid placement within the wellbore 120. When the damaged portions 284 along the inner surface 123 are repaired or the sealing material 272 has been used up, the downhole tool 200 may then be removed from the wellbore 120.

Although FIGS. 8-10 show the sealing material 272 being melted by the laser beam 252, the sealing material 272 may also or instead be melted by activating the heating means 274. As described above, the heating means 274 may comprise one or more electrical heating coils or other elements (not shown) disposed substantially along the sealing material 272. Accordingly, the electrical power may be provided from the control center 180 to the heating means 274 via the electrical conductor 181. The heating means 274 may also or instead comprise one or more thermites and/or other heat-generating chemical elements, such as may be disposed in solid or powder form substantially along the sealing material 272. The heat-generating chemical elements may be activated to generate heat via chemical reaction, thus melting the sealing material 272. Once melted, the sealing material 273 may flow downhole between the housing 210 of the laser cutting apparatus 202 and the inner surface 123. The melted sealing material 273 may then be directed or operated upon as described above.

Figure 11:
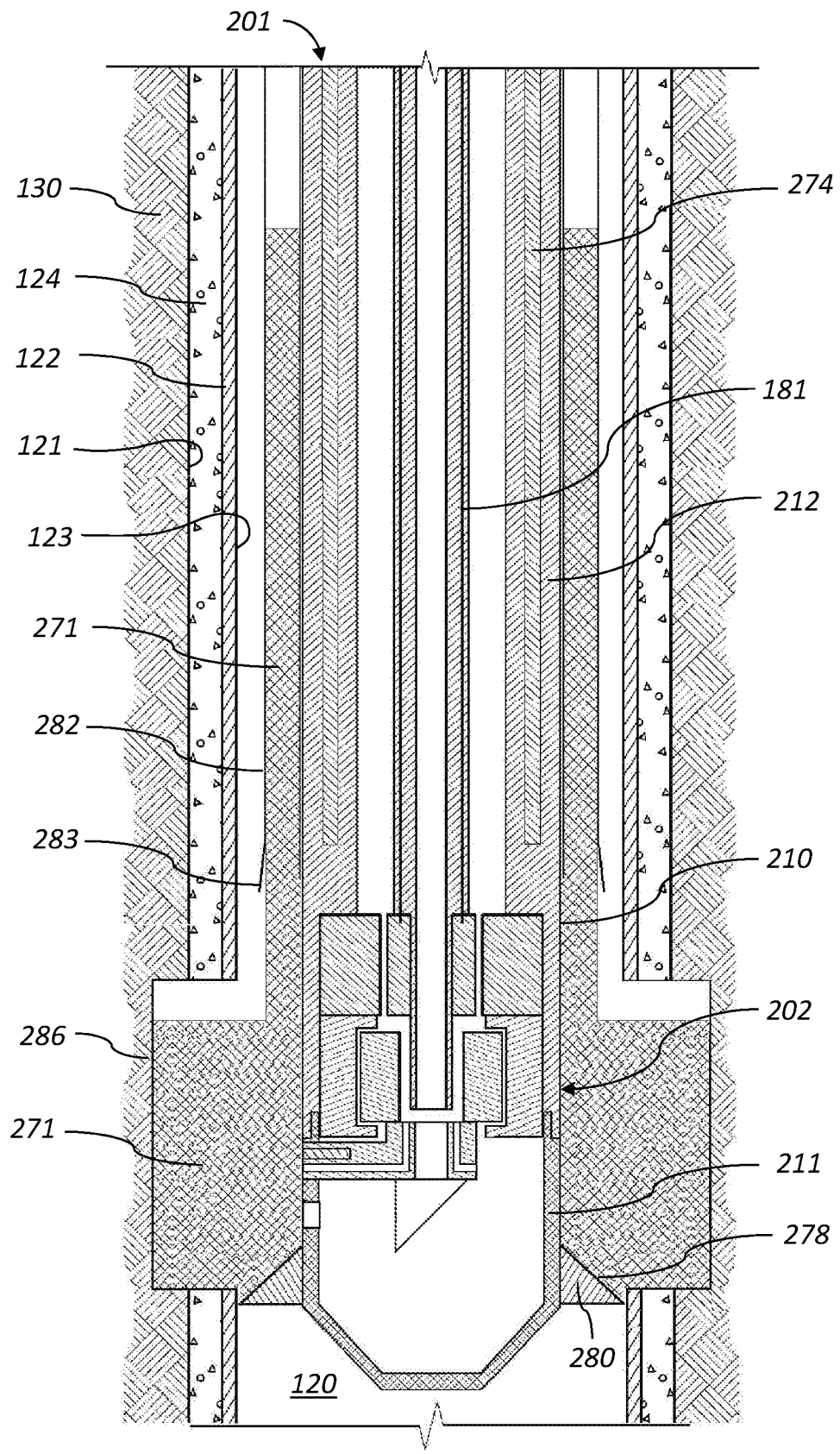
Figure 12:
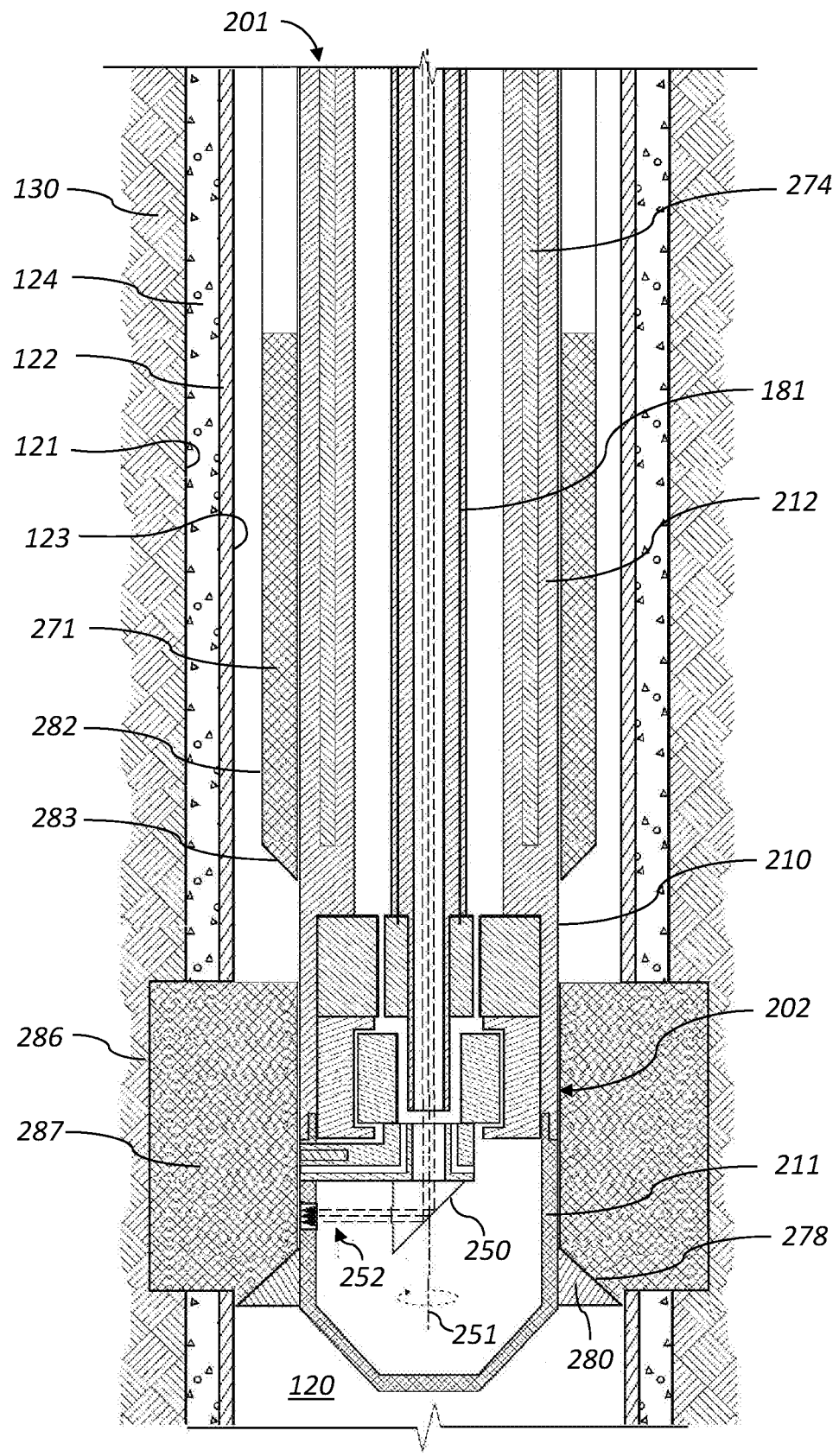
Figure 13:
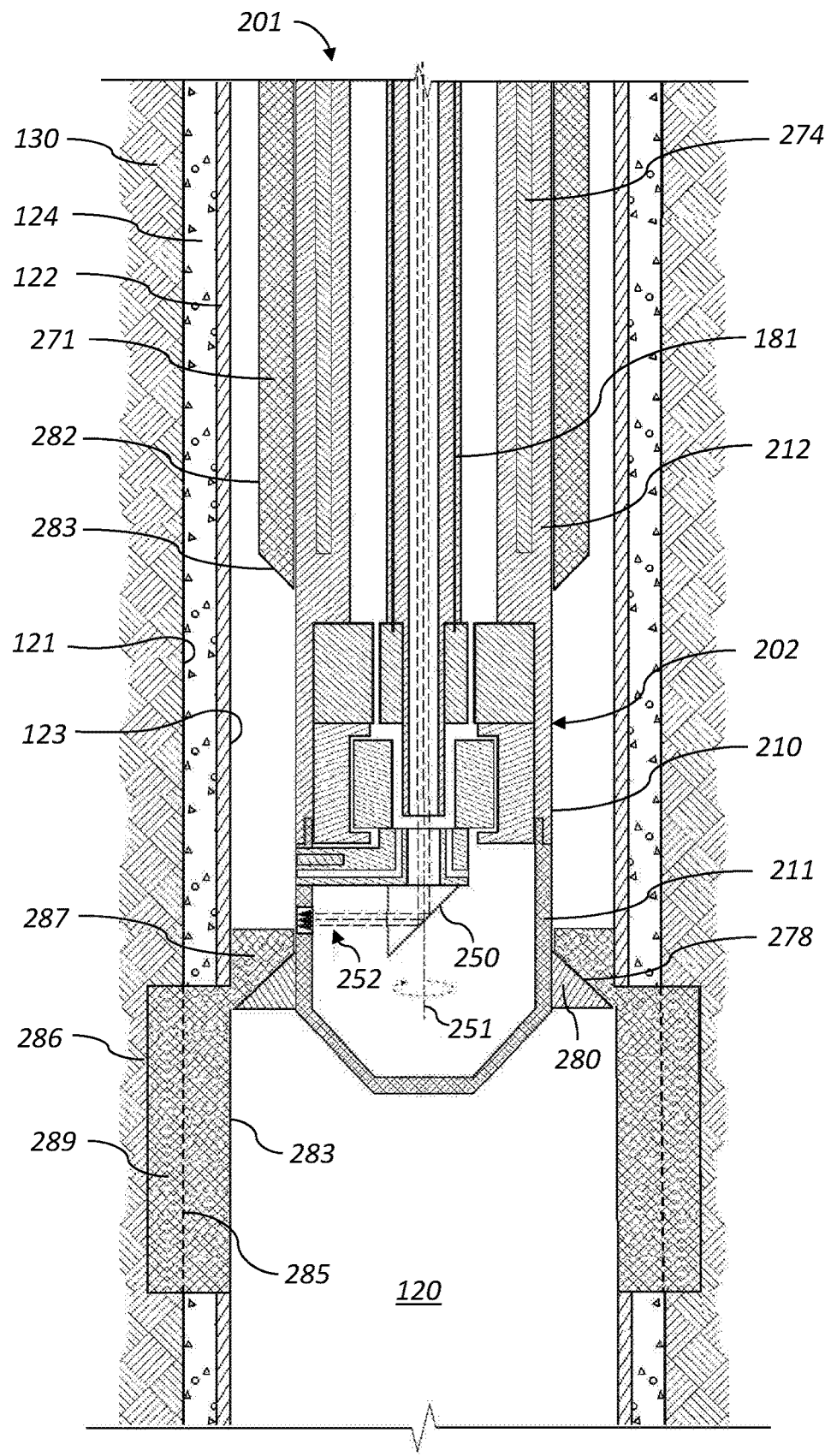

FIGS. 11-13 are schematic sectional views of another example implementation of the downhole tool 200 shown in FIGS. 2-10 according to one or more aspects of the present disclosure, and designated in FIGS. 11-13 by reference number 201. Unless described otherwise, the downhole tool 201 is substantially similar to the downhole tool 200 shown in FIGS. 2-10, including where indicated by like reference numbers. The following description refers to FIGS. 1 and 11-13, collectively.

When utilizing the downhole tool 201 during the sealing operations, the particulate sealing material 271 may be placed within the radial slot 286 without first being melted. As shown in FIG. 11, when the intended radial slot 286 has been formed and the spreader 280 is positioned along or slightly below the downhole end of the radial slot 286, the release mechanism 282 may be actuated to an open position to permit the sealing material 271 to flow out of the container 281. Gravity may then cause the sealing material 271 to axially flow in the downhole direction along the housing 210 of the laser cutting apparatus 202. The spreader 280 may urge the sealing material 271 to flow into the radial slot 286 and prevent the sealing material 271 to flow further downhole into the wellbore 120.

As shown in FIG. 12, once the sealing material 271 substantially fills the radial slot 286, the release mechanism 282 by be actuated to a closed position to stop the flow of the sealing material 271. Prior to or after the sealing material 271 substantially fills the radial slot 286, the laser source 190 may be activated to transmit the laser beam 252 to the laser cutting apparatus 202. The laser beam 252, directed by the deflector 250 at the sealing material 271 within the radial slot 286, may increase the temperature of the sealing material 271 until it melts. The deflector 250 may rotate about the axis of rotation 251 to melt the sealing material 271 disposed within the radial slot 286 around the housing 210. Prior to or after the sealing material within the whole radial slot 286 is melted, the coiled tubing injector 171 may be activated to move the tool string 110, including the laser cutting apparatus 202, along the wellbore 120 in the uphole direction.

As the downhole tool 200 moves uphole, the spreader 280 may further urge the melted sealing material 287 into the radial slot 286. The spreader 280, the housing 210, and/or another portion of the tool string 110 that contacts the melted sealing material 287 absorb heat from the melted sealing material 287 and shape the melted sealing material 287 to form the inner surface 283 that is substantially continuous with the inner surface 123 of the casing 122, as shown in FIG. 13. If the radial slot 286 was formed in the open-hole implementation of the wellbore 120, the downhole tool 200 will have shaped the melted sealing material 287 to form the inner surface 285 (shown in phantom lines) that is substantially continuous with the sidewall 121 of the wellbore 120.

The downhole tool 200 may be moved in the uphole direction at a speed that permits the melted sealing material 287 to cool to a temperature at which the viscosity and/or other properties of the melted sealing material 273 reach an intended level of solidity to permit shaping of the melted sealing material 287 as intended. The properties of the sealing material may be selected such that the sealing material chemically and/or otherwise bonds with the casing 122, the cement sheath 124, and/or the formation 130 and/or otherwise permits the sealing material to be molded and/or otherwise shaped by the spreader 280. Accordingly, as the melted sealing material 287 cools and solidifies, the solidified sealing material 289 adheres to or remains within the radial slot 286 without further flowing downhole along the inner surface 123 of the casing 122 or otherwise deforming from the shape formed by the spreader 280. The solidified sealing material 289 may form the patch to seal the radial slot 286 and/or may provide the inner surface 283, which may permit subsequent downhole tool or fluid placement within the wellbore 120. When the damaged portions 284 along the inner surface 123 are repaired or the sealing material 271 has been used up, the downhole tool 200 may then be removed from the wellbore 120.

Although FIGS. 12 and 13 show the sealing material 271 being melted by the laser beam 252, the sealing material 271 may also or instead be melted by activating the heating means 274. As described above, the heating means 274 may comprise one or more electrical heating coils or other elements (not shown). Accordingly, the electrical power may be provided from the control center 180 to the heating means 274 via the electrical conductor 181. The heating means 274 may also or instead comprise one or more thermites and/or other heat-generating chemical elements. The heat-generating chemical elements may be activated to generate heat via chemical reaction. Accordingly, when the sealing material 271 is disposed within the radial slot 286, the downhole tool 200 may be moved axially to align the heating means 274 with the sealing material 271 within the radial slot 286, such as may permit heat transfer between the heating means 274 and the sealing material 271 to melt the sealing material 271. The melted sealing material 287 may then be directed or operated upon as described above.

Although FIGS. 2-13 show the downhole tool 200 operable perform both the laser cutting and sealing operations during a single trip to the damaged portion 284 of the wellbore 120, it is to be understood that the laser cutting and sealing operations may be performed during multiple trips and/or by utilizing multiple downhole tools. For example the laser cutting operations may be performed during a first downhole trip with a laser cutting tool, which may comprise the same or similar structure as the laser cutting apparatus 202 described above with respect to the laser cutting apparatus 202. To form the radial slot 286, the laser cutting apparatus may perform the same or similar operations as described above. Once the intended one or more radial slots 286 are formed with the laser cutting apparatus, the sealing operations may be performed during a second downhole trip with a sealing tool. Such sealing tool may comprise a sealing material, a heating means, a mandrel, and a spreader, each comprising the same or similar structure as the sealing material 271, 272, the heating means 274, the housing 210, and the spreader 280, respectively, described above. To seal the radial slot 286, the sealing tool may perform the same or similar operations as described above with respect to the downhole tool 200, including the sealing material 271, 272, the heating means 274, the housing 210, and the spreader 280.

The downhole tools 200, 201 described above may also or instead be operable to perform well abandonment operations. For example, the downhole tools 200, 201 may be deployed within the wellbore 120 and subsequently operated to fill the wellbore 120 in order to plug and abandon the wellbore 120. The downhole tools 200, 201 may be operated as described above, but permit the melted sealing material 273, 287 to solidify around the lower housing 211 or a tool 112 coupled below the downhole tools 200, 201 without removing the lower housing 211 or the tool 112 before such solidification. Accordingly, the lower housing 211 or the tool 112 and the solidified sealing material 279, 289 may collectively form a solid plug preventing communication of wellbore fluids between portions of the wellbore 120 above and below the plug. The lower housing 211 or the tool 112 may then be decoupled or severed from the upper housing 212 or the downhole tool 200, 201 and left in the wellbore 120. The downhole tool 200, 201 may instead be decoupled or severed from the rest of the tool string 110 and left in the wellbore 120.

In view of the entirety of the present disclosure, including the figures and the claims, a person having ordinary skill in the art will readily recognize that the present disclosure introduces an apparatus comprising: a downhole tool for conveyance within a tubular secured in a wellbore extending into a subterranean formation, wherein the downhole tool comprises: a laser apparatus operable to cut a slot in the tubular; and a sealing material; wherein the downhole tool is operable to provide melted sealing material within the slot.

The melted sealing material within the slot may seal the slot upon solidification after cooling.

The downhole tool may be operable to: melt the sealing material; and direct the melted sealing material into the slot.

The downhole tool may instead be operable to: direct the sealing material into the slot; and melt the sealing material within the slot. For example, the sealing material may comprise a particulate form able to flow into the slot before melting. In such implementations, among others within the scope of the present disclosure, the sealing material may be contained within and selectively released from a container, and the downhole tool may comprise or carry the container.

The laser apparatus may be operable to cut the slot in the tubular by directing a laser beam upon a side surface of the tubular, and the laser apparatus may be further operable to melt the sealing material by directing the laser beam upon the sealing material.

The downhole tool may further comprise an electrical heating coil operable to melt the sealing material.

The downhole tool may be further operable to activate a heat-generating chemical reaction to melt the sealing material.

The sealing material may be disposed at least partially about the laser apparatus.

The laser apparatus may be operable to cut the slot in the tubular by directing a laser beam upon a side surface of the tubular, and one of the laser apparatus and the sealing material may be movable with respect to the other to direct the laser beam upon the sealing material to melt the sealing material.

The laser apparatus may comprise: a housing; a deflector operable to rotate to direct a laser beam upon a predetermined portion of a side surface of the tubular; and a motor operable to rotate the deflector. In such implementations, among others within the scope of the present disclosure, the sealing material may be disposed at least partially about the housing, and at least one of the deflector and the sealing material may be axially movable with respect to the other to direct the laser beam upon the sealing material to melt the sealing material.

The laser apparatus may be operable to cut the slot along a damaged portion of the tubular designated for repair to remove the damaged portion of the tubular.

The tubular may be a casing member or a section of completion/production tubing.

The sealing material may be a eutectic material having a eutectic temperature at which the eutectic material melts. For example, the eutectic material may comprise an alloy of two or more different metals each having an individual melting temperature that is greater than the eutectic temperature, such as in implementations in which the eutectic sealing material substantially comprises a bismuth-based alloy. The bismuth-based alloy may substantially comprise about 58% bismuth and about 42% tin, by weight.

The downhole tool may comprise a housing having a downhole portion comprising a first outer diameter that is substantially larger than a second outer diameter of an uphole portion of the downhole tool, and a surface transitioning between the first and second outer diameters may define a spreader that urges the sealing material into the slot. The tubular may comprise an inner diameter that is substantially equal to the first outer diameter of the downhole portion of the housing. The spreader may be a substantially frustoconical surface extending axially tapered between the first and second outer diameters and extending circumferentially substantially continuously around the housing.

The downhole tool may further comprise a spreader disposed downhole from the sealing material. The spreader may be movable between a retracted position and an expanded position. In the retracted position, the spreader may comprise a first outer diameter, and in the expanded position, the spreader may comprise a second outer diameter that is substantially larger than the first outer diameter. In the expanded position, the spreader may urge the sealing material radially outward toward a side surface of the tubular. The spreader may comprise a tapered surface extending circumferentially substantially continuously around the downhole tool.

The downhole tool may further comprise a sensor operable to generate information indicative of a depth of the slot. The sensor may be an acoustic sensor operable to emit an acoustic signal into the slot and detect a reflection of the acoustic signal from an end of the slot. The sensor may be an electromagnetic sensor operable to emit an electromagnetic signal into the slot and detect a reflection of the electromagnetic signal from an end of the slot.

The downhole tool may be conveyable within the tubular via coiled tubing operable to communicate a fluid from a wellsite surface from which the wellbore extends to the downhole tool, and the downhole tool may further comprise a nozzle operable to direct the fluid into the slot. The laser apparatus may be operable to direct a laser beam along a first radial path while cutting the slot, and the nozzle may be operable to direct the fluid along a second radial path that at least partially overlaps the first radial path.

The laser apparatus may be in optical communication with a laser source located at a wellsite surface from which the wellbore extends.

The downhole tool may be operable for conveyance within the tubular via coiled tubing.

The present disclosure also introduces an apparatus comprising: a downhole tool for conveyance within a tubular secured within a wellbore extending into a subterranean formation, wherein the downhole tool comprises: a laser apparatus operable to form a slot along the tubular; a sealing material; and a spreader operable to direct the sealing material into the slot, wherein the downhole tool is operable to melt the sealing material within the slot.

The melted sealing material within the slot may seal the slot upon solidification after cooling.

The sealing material may comprise a particulate form operable to flow into the slot. The sealing material may be contained within a container from which the sealing material is selectively released.

The laser apparatus may be operable to form the slot along the tubular by directing a laser beam upon a side surface of the tubular, and the laser apparatus may be further operable to melt the sealing material by directing the laser beam upon the sealing material.

The downhole tool may further comprise an electrical heating coil operable to melt the sealing material.

The downhole tool may be further operable to activate a heat-generating chemical reaction to melt the sealing material.

The sealing material may be disposed at least partially about the laser apparatus.

The laser apparatus may comprise: a housing; a deflector operable to rotate to direct a laser beam upon a predetermined portion of a side surface of the tubular; and a motor operable to rotate the deflector, wherein the sealing material is disposed at least partially about the housing.

The laser apparatus may be operable to form the slot along a damaged portion of a side surface of the tubular to remove the damaged portion of the tubular.

The tubular may be a casing member or a section of completion/production tubing.

The sealing material may be a eutectic material having a eutectic temperature at which the eutectic material melts. For example, the eutectic material may comprise an alloy of two or more different metals each having an individual melting temperature that is greater than the eutectic temperature, such as in implementations in which the eutectic sealing material substantially comprises a bismuth-based alloy. The bismuth-based alloy may substantially comprise about 58% bismuth and about 42% tin, by weight.

The downhole tool may comprise a housing having a downhole portion comprising a first outer diameter that is substantially larger than a second outer diameter of an uphole portion of the downhole tool, and a surface transitioning between the first and second outer diameters may define the spreader. The tubular may comprise an inner diameter that is substantially equal to the first outer diameter of the downhole portion of the housing. The spreader may be a substantially frustoconical surface extending between the first and second outer diameters and extending circumferentially substantially continuously around the housing.

The spreader may be disposed downhole from the sealing material, and the spreader may be movable between a retracted position and an expanded position. In the retracted position, the spreader may comprise a first outer diameter. In the expanded position, the spreader may comprise a second outer diameter that is substantially larger than the first outer diameter. In the expanded position, the spreader may urge the sealing material radially outward toward a side surface of the tubular. In such implementations, among others within the scope of the present disclosure, the spreader may comprise an axially tapered surface extending circumferentially substantially continuously around the downhole tool.

The downhole tool may further comprise a sensor operable to generate information indicative of a depth of the slot. The sensor may be an acoustic sensor operable to emit an acoustic signal into the slot and detect a reflection of the acoustic signal from an end of the slot. The sensor may be an electromagnetic sensor operable to emit an electromagnetic signal into the slot and detect a reflection of the electromagnetic signal from an end of the slot.

The downhole tool may be conveyable within the tubular via coiled tubing operable to communicate a fluid from a wellsite surface from which the wellbore extends to the downhole tool, and the downhole tool may further comprise a nozzle operable to direct the fluid into the slot. The laser apparatus may be operable to direct a laser beam along a first radial path while cutting the slot, and the nozzle may be operable to direct the fluid along a second radial path that at least partially overlaps the first radial path.

The laser apparatus may be in optical communication with a laser source located at a wellsite surface from which the wellbore extends.

The downhole tool may be operable for conveyance within the tubular via coiled tubing.

The present disclosure also introduces a method comprising: conveying a laser apparatus within a tubular secured within a wellbore extending into a subterranean formation; operating the laser apparatus to form a slot along the tubular; conveying a sealing material within the tubular; and providing a melted sealing material within the slot such that the melted sealing material seals the slot upon solidification.

Operating the laser apparatus to form the slot along the tubular may comprise operating the laser apparatus to form the slot along a damaged portion of the tubular to remove the damaged portion of the tubular.

Providing the melted sealing material within the slot may comprise: melting the sealing material downhole; and directing the melted sealing material into the slot.

Providing the melted sealing material within the slot may comprise: directing the sealing material into the slot; and melting the sealing material within the slot. In such implementations, among others within the scope of the present disclosure, the sealing material may comprise a particulate form operable to flow into the slot.

Providing the melted sealing material within the slot may comprise substantially filling the slot with the melted sealing material.

A downhole tool may comprise the laser apparatus and the sealing material, and the downhole tool may melt the sealing material.

The laser apparatus may comprise a laser beam deflector, and forming the slot in the tubular may comprise operating the laser apparatus to rotate the laser beam deflector to direct a laser beam upon a side surface of the tubular to form the slot.

The method may further comprise detecting a depth of the slot.

The method may further comprise discharging a fluid into the slot to flush debris out of the slot.

A downhole tool may comprise the laser apparatus, the sealing material, and an electrical coil, and providing the melted sealing material within the slot may comprise electrically energizing the electrical coil to heat the sealing material to at least a melting temperature of the sealing material.

Providing the melted sealing material within the slot may comprise activating a heat-generating chemical reaction to heat the sealing material to at least a melting temperature of the sealing material.

Providing the melted sealing material within the slot may comprise operating the laser apparatus to direct a laser beam upon the sealing material to heat the sealing material to at least a melting temperature of the sealing material. In such implementations, among others within the scope of the present disclosure, operating the laser apparatus to direct the laser beam upon the sealing material may comprise causing at least one of the laser apparatus and the sealing material to move with respect to the other such that the laser apparatus directs the laser beam upon the sealing material to heat the sealing material to at least the melting temperature of the sealing material.

The sealing material may be a eutectic material having a eutectic temperature at which the eutectic material melts, such as in implementations in which the eutectic material comprises an alloy of two or more different metals each having an individual melting temperature that is greater than the eutectic temperature.

Providing the melted sealing material within the slot may comprise utilizing a spreader. Utilizing the spreader may comprise actuating the spreader from a retracted position having a first outer diameter to an expanded position having a second outer diameter, wherein the second outer diameter is substantially greater than the first outer diameter. Utilizing the spreader may comprise moving the spreader relative to the slot to urge the melted sealing material into the slot. Moving the spreader may comprise moving the spreader in an axial direction within the tubular.

The method may further comprise moving a spreader in an axial direction within the tubular to shape the melted sealing material to include a surface that is substantially continuous with a surface of the tubular.

Conveying the laser apparatus within the tubular may comprise conveying the laser apparatus via coiled tubing. The wellbore may extend from a wellsite surface, the method may further comprise communicating a fluid from the wellsite surface to the laser apparatus via the coiled tubing, and operating the laser apparatus to form the slot utilizing the laser apparatus may comprise directing the fluid from the coiled tubing into the slot.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a downhole tool for conveyance within a tubular secured in a wellbore extending into a subterranean formation, wherein the downhole tool comprises:
a laser apparatus operable to cut a slot in the tubular, the laser apparatus comprising:
a housing;
a deflector operable to rotate to direct a laser beam upon a predetermined portion of a side surface of the tubular; and
a motor operable to rotate the deflector; and
a sealing material, wherein the sealing material is disposed at least partially about the housing, and wherein at least one of the deflector and the sealing material is axially movable with respect to the other to direct the laser beam upon the sealing material to melt the sealing material;
wherein the downhole tool is operable to provide melted sealing material within the slot and to provide a path for flowing sealing material from the downhole tool and into the slot.

2. The apparatus of claim 1 wherein the melted sealing material within the slot seals the slot upon solidification after cooling.

3. The apparatus of claim 1 wherein the laser apparatus is operable to cut the slot along a damaged portion of the tubular designated for repair to remove the damaged portion of the tubular.

4. The apparatus of claim 1 wherein the tubular is a casing member.

5. The apparatus of claim 1 wherein the tubular is a section of completion/production tubing.

6. The apparatus of claim 1 wherein the sealing material is a eutectic material having a eutectic temperature at which the eutectic material melts.

7. The apparatus of claim 6 wherein the eutectic material comprises an alloy of two or more different metals each having an individual melting temperature that is greater than the eutectic temperature.

8. The apparatus of claim 6 wherein the eutectic sealing material substantially comprises a bismuth-based alloy.

9. The apparatus of claim 8 wherein the bismuth-based alloy substantially comprises about 58% bismuth and about 42% tin, by weight.

10. The apparatus of claim 1 wherein the downhole tool further comprises a sensor operable to generate information indicative of a depth of the slot.

11. The apparatus of claim 10 wherein the sensor is an acoustic sensor operable to emit an acoustic signal into the slot and detect a reflection of the acoustic signal from an end of the slot.

12. The apparatus of claim 10 wherein the sensor is an electromagnetic sensor operable to emit an electromagnetic signal into the slot and detect a reflection of the electromagnetic signal from an end of the slot.

13. The apparatus of claim 1 wherein the laser apparatus is in optical communication with a laser source located at a wellsite surface from which the wellbore extends.

14. The apparatus of claim 1 wherein the downhole tool is operable for conveyance within the tubular via coiled tubing.

15. An apparatus comprising:
a downhole tool for conveyance within a tubular secured in a wellbore extending into a subterranean formation, wherein the downhole tool comprises:
a laser apparatus operable to cut a slot in the tubular; and
a sealing material;
wherein the downhole tool is operable to provide melted sealing material within the slot and to provide a path for flowing sealing material from the downhole tool and into the slot; and
wherein the downhole tool comprises a housing having a downhole portion comprising a first outer diameter that is larger than a second outer diameter of an uphole portion of the downhole tool, and wherein a surface transitioning between the first and second outer diameters defines a spreader that urges the sealing material into the slot.

16. The apparatus of claim 15 wherein the downhole tool is operable to:
melt the sealing material; and
direct the melted sealing material into the slot.

17. The apparatus of claim 15 wherein the downhole tool is operable to:
direct the sealing material into the slot; and
melt the sealing material within the slot.

18. The apparatus of claim 17 wherein the sealing material comprises a particulate form able to flow into the slot before melting.

19. The apparatus of claim 18 wherein the sealing material is contained within and selectively released from a container, and wherein the downhole tool comprises or carries the container.

20. The apparatus of claim 15 wherein the laser apparatus is operable to cut the slot in the tubular by directing a laser beam upon a side surface of the tubular, and wherein the laser apparatus is further operable to melt the sealing material by directing the laser beam upon the sealing material.

21. The apparatus of claim 15 wherein the downhole tool further comprises an electrical heating coil operable to melt the sealing material.

22. The apparatus of claim 15 wherein the downhole tool is further operable to activate a heat-generating chemical reaction to melt the sealing material.

23. The apparatus of claim 15 wherein the sealing material is disposed at least partially about the laser apparatus.

24. The apparatus of claim 15 wherein the laser apparatus is operable to cut the slot in the tubular by directing a laser beam upon a side surface of the tubular, and wherein one of the laser apparatus and the sealing material is movable with respect to the other to direct the laser beam upon the sealing material to melt the sealing material.

25. The apparatus of claim 15 wherein the tubular comprises an inner diameter that is substantially equal to the first outer diameter of the downhole portion of the housing.

26. The apparatus of claim 15 wherein the spreader is a substantially frustoconical surface extending axially tapered between the first and second outer diameters and extending circumferentially substantially continuously around the housing.

27. The apparatus of claim 15 wherein the melted sealing material within the slot seals the slot upon solidification after cooling.

28. The apparatus of claim 15 wherein the laser apparatus is operable to cut the slot along a damaged portion of the tubular designated for repair to remove the damaged portion of the tubular.

29. The apparatus of claim 15 wherein the sealing material is a eutectic material having a eutectic temperature at which the eutectic material melts, and wherein the eutectic sealing material substantially comprises a bismuth-based alloy.

30. An apparatus comprising:
a downhole tool for conveyance within a tubular secured in a wellbore extending into a subterranean formation, wherein the downhole tool comprises:
a laser apparatus operable to cut a slot in the tubular; and
a sealing material;
wherein the downhole tool is operable to provide melted sealing material within the slot and to provide a path for flowing sealing material from the downhole tool and into the slot; and
wherein the downhole tool further comprises a spreader disposed downhole from the sealing material, wherein the spreader is movable between a retracted position and an expanded position, wherein in the retracted position the spreader comprises a first outer diameter, wherein in the expanded position the spreader comprises a second outer diameter that is larger than the first outer diameter, and wherein in the expanded position the spreader urges the sealing material radially outward toward a side surface of the tubular.

31. The apparatus of claim 30 wherein the spreader comprises a tapered surface extending circumferentially substantially continuously around the downhole tool.

32. An apparatus comprising:
a downhole tool for conveyance within a tubular secured in a wellbore extending into a subterranean formation, wherein the downhole tool comprises:
a laser apparatus operable to cut a slot in the tubular, and a sealing material;
wherein the downhole tool is operable to provide melted sealing material within the slot and to provide a path for flowing sealing material from the downhole tool and into the slot;
wherein the downhole tool is conveyable within the tubular via coiled tubing operable to communicate a fluid from a wellsite surface from which the wellbore extends to the downhole tool, and wherein the downhole tool further comprises a nozzle operable to direct the fluid into the slot; and
wherein the laser apparatus is operable to direct a laser beam along a first radial path while cutting the slot, and wherein the nozzle is operable to direct the fluid along a second radial path that at least partially overlaps the first radial path.

33. A method comprising:
conveying a laser apparatus within a tubular secured within a wellbore extending into a subterranean formation;
operating the laser apparatus to form a slot along the tubular;
conveying a sealing material within the tubular; and
providing the sealing material within the slot such that the sealing material, when melted, seals the slot upon solidification, wherein the laser apparatus is configured to provide a path for the melted sealing material; and
wherein providing the melted sealing material within the slot comprises utilizing a spreader.

34. The method of claim 33 wherein operating the laser apparatus to form the slot along the tubular comprises operating the laser apparatus to form the slot along a damaged portion of the tubular to remove the damaged portion of the tubular.

35. The method of claim 33 wherein providing the melted sealing material within the slot comprises:
melting the sealing material downhole; and
directing the melted sealing material into the slot.

36. The method of claim 33 wherein providing the melted sealing material within the slot comprises:
directing the sealing material into the slot; and
melting the sealing material within the slot.

37. The method of claim 36 wherein the sealing material comprises a particulate form operable to flow into the slot.

38. The method of claim 33 wherein providing the melted sealing material within the slot comprises substantially filling the slot with the melted sealing material.

39. The method of claim 33 wherein a downhole tool comprises the laser apparatus and the sealing material, and wherein the downhole tool melts the sealing material.

40. The method of claim 33 wherein the laser apparatus comprises a laser beam deflector, and wherein forming the slot in the tubular comprises operating the laser apparatus to rotate the laser beam deflector to direct a laser beam upon a side surface of the tubular to form the slot.

41. The method of claim 33 wherein providing the melted sealing material within the slot comprises operating the laser apparatus to direct a laser beam upon the sealing material to heat the sealing material to at least a melting temperature of the sealing material.

42. The method of claim 41 wherein operating the laser apparatus to direct the laser beam upon the sealing material comprises causing at least one of the laser apparatus and the sealing material to move with respect to the other such that the laser apparatus directs the laser beam upon the sealing material to heat the sealing material to at least the melting temperature of the sealing material.

43. The method of claim 33 wherein utilizing the spreader comprises actuating the spreader from a retracted position having a first outer diameter to an expanded position having a second outer diameter, and wherein the second outer diameter is greater than the first outer diameter.

44. The method of claim 33 wherein utilizing the spreader comprises moving the spreader relative to the slot to urge the melted sealing material into the slot.

45. The method of claim 44 wherein moving the spreader comprises moving the spreader in an axial direction within the tubular.

46. The method of claim 33 further comprising moving the spreader in an axial direction within the tubular to shape the melted sealing material to include a surface that is substantially continuous with a surface of the tubular.

47. The method of claim 33 wherein conveying the laser apparatus within the tubular comprises conveying the laser apparatus via coiled tubing.

48. The method of claim 47 wherein:
the wellbore extends from a wellsite surface;
the method further comprises communicating a fluid from the wellsite surface to the laser apparatus via the coiled tubing; and
operating the laser apparatus to form the slot utilizing the laser apparatus comprises directing the fluid from the coiled tubing into the slot.

* * * * *